US010695742B2

(12) United States Patent
DuBois

(10) Patent No.: US 10,695,742 B2
(45) Date of Patent: Jun. 30, 2020

(54) REFORMING WITH OXYGEN-ENRICHED MATTER

(71) Applicant: The Government of the United States, as represented by the Secretary of the Army, Washington, DC (US)

(72) Inventor: Terry DuBois, Forest Hill, MD (US)

(73) Assignee: The Government of the United States, as represented by the Secretary of the Army, Washington, DC (US)

( * ) Notice: Subject to any disclaimer, the term of this patent is extended or adjusted under 35 U.S.C. 154(b) by 153 days.

(21) Appl. No.: 15/951,212

(22) Filed: Apr. 12, 2018

(65) Prior Publication Data

US 2018/0229209 A1   Aug. 16, 2018

Related U.S. Application Data

(62) Division of application No. 14/726,809, filed on Jun. 1, 2015, now Pat. No. 9,968,906.

(51) Int. Cl.
*B01J 19/24* (2006.01)
*C01B 3/38* (2006.01)
(Continued)

(52) U.S. Cl.
CPC ............ *B01J 19/24* (2013.01); *B01J 12/007* (2013.01); *B01J 19/0013* (2013.01); *C01B 3/38* (2013.01); *C01B 13/0251* (2013.01); *G05B 15/02* (2013.01); *B01J 2219/00063* (2013.01); *B01J 2219/00065* (2013.01); *B01J 2219/00069* (2013.01); *B01J 2219/00087* (2013.01);
(Continued)

(58) Field of Classification Search
CPC .......... C01B 2203/159; C01B 13/0251; C01B 2203/0244; C01B 2203/025; C01B 2203/0405; C01B 2203/0805
See application file for complete search history.

(56) References Cited

U.S. PATENT DOCUMENTS 4,314,898 A  *  2/1982  Nakako .................. C10G 1/006
                                                      208/412
4,432,863 A  *  2/1984  Myers ....................... C01B 3/38
                                                      208/108

(Continued)

OTHER PUBLICATIONS

Dubois, Terry Grice; Oxygen-Enriched Fuel Reforming of Heavy Liquid Hydrocarbon Fuels for Fuel Cells; A Dissertation; 2011; The Catholic University of America; Washington, D.C.

(Continued)

*Primary Examiner* — Imran Akram
(74) *Attorney, Agent, or Firm* — Ronald Krosky; Azza Jayaprakash

(57) ABSTRACT

Various embodiments that pertain to oxygen enrichment are described. Oxygen enrichment is shown to allow for independent control of both reformer residence time and the oxygen-to-carbon ratio during reforming. This allows for much better control over the reformer and for significant gains in reformer through-put without negative impacts to reformer performance. Additionally, the use of oxygen enriched reforming is shown to result in enhanced reformer performance, reduced degradation from catalyst poisons (carbon formation and sulfur) and enhanced fuel cell stack performance due to greatly increased hydrogen concentration in the reformate.

13 Claims, 29 Drawing Sheets

(51) Int. Cl.
  *C01B 13/02* (2006.01)
  *G05B 15/02* (2006.01)
  *B01J 12/00* (2006.01)
  *B01J 19/00* (2006.01)
(52) U.S. Cl.
  CPC .............. *B01J 2219/00117* (2013.01); *B01J 2219/00159* (2013.01); *B01J 2219/24* (2013.01); *C01B 2203/0227* (2013.01)

(56) References Cited

U.S. PATENT DOCUMENTS

| | | | | |
|---|---|---|---|---|
| 6,089,855 | A * | 7/2000 | Becker | F23C 3/006 431/10 |
| 6,183,241 | B1 * | 2/2001 | Bohn | F23D 14/16 122/DIG. 3 |
| 6,322,917 | B1 * | 11/2001 | Acker | B01J 19/0006 429/412 |
| 8,722,010 | B1 | 5/2014 | Grover | |
| 2001/0002043 | A1 * | 5/2001 | Naka | B01B 1/005 252/373 |
| 2002/0031690 | A1 * | 3/2002 | Shimazu | B01B 1/005 429/425 |
| 2004/0053087 | A1 | 3/2004 | Akikusa et al. | |
| 2004/0180973 | A1 | 9/2004 | Hershkowitz | |
| 2005/0008904 | A1 | 1/2005 | Suppes | |
| 2005/0210877 | A1 * | 9/2005 | Rabinovich | B01J 19/088 60/643 |
| 2005/0257426 | A1 * | 11/2005 | Kabashima | C01B 3/382 48/198.7 |
| 2006/0035122 | A1 | 2/2006 | Weissman et al. | |
| 2006/0057444 | A1 | 3/2006 | Takagi et al. | |
| 2007/0104641 | A1 | 5/2007 | Ahmed et al. | |
| 2008/0312347 | A1 | 12/2008 | Ernst et al. | |
| 2009/0062591 | A1 * | 3/2009 | Bingue | B01J 8/001 585/899 |
| 2010/0200812 | A1 | 8/2010 | Yamada et al. | |
| 2010/0279184 | A1 | 11/2010 | Takeuchi et al. | |
| 2013/0312384 | A1 * | 11/2013 | Hwang | F02C 3/20 60/39.12 |
| 2013/0345325 | A1 | 12/2013 | Lecomte et al. | |
| 2014/0087279 | A1 | 3/2014 | Kiyohiro | |
| 2015/0099812 | A1 | 4/2015 | Kelly | |
| 2016/0254557 | A1 | 9/2016 | Finnerty et al. | |

OTHER PUBLICATIONS

Mayne, Joseph M., et al.; Influence of thiophene on the isooctane reforming activity of Ni-based catalysts; Journal of Catalysis; vol. 271, Issue 1, pp. 140-152; Apr. 2010; Elsevier.

* cited by examiner

REFORMING WITH OXYGEN-ENRICHED MATTER

CROSS-REFERENCE

This application is a divisional of, and claims priority to, the United States patent application that was filed on Jun. 1, 2015 with an application Ser. No. 14/726,809 and that application is hereby incorporated by reference.

GOVERNMENT INTEREST

The innovation described herein may be manufactured, used, imported, sold, and licensed by or for the Government of the United States of America without the payment of any royalty thereon or therefor.

BACKGROUND

In oxidative catalytic reforming, a fuel and another substance can be heated and reacted. Examples of this other substance can be steam, air, or water and air. Depending on which substance is used, different chemical reaction can occur and these chemical reactions can be used to produce power through an electrochemical energy conversion device or another energy conversion device. This power can be used to power machinery as well as be put to other uses.

SUMMARY

In one embodiment, a system comprises a separator and a reformer. The separator can be configured to separates an air into an oxygen-enriched portion and a nitrogen-enriched portion and the reformer can be configured to produce an energy from at least a fuel and an oxygen-based gas. The separator can supply the oxygen-enriched portion to the reformer and the reformer uses the oxygen-enriched portion as the oxygen-based gas.

In one embodiment, a method can be configured to be performed, at least in part, by at least part of a fuel system. The method comprises identifying a desired residence time for a reaction set of a reformer that is part of the fuel system and causing the reformer to be supplied with a matter state at an oxygen-enrichment level to meet the desired residence time. The oxygen-enrichment level of the matter state can be higher than an oxygen-enrichment level of air.

In one embodiment, a system comprises a recognition component that recognizes an operational temperature of a reformer and a temperature component that determines that the operational temperature of the reformer is not a desired temperature of the reformer. The system also comprises an evaluation component that evaluates the operational temperature against the desired temperature to produce an evaluation result and a modification component that determines how to modify a supply metric for the reformer to achieve the desired temperature of the reformer based, at least in part, on the evaluation result. The system additionally comprises a causation component that causes implementation of the supply metric in modified form and a processor that executes at least one instruction associated with the recognition component, the temperature component, the evaluation component, the modification component, the causation component, or a combination thereof.

BRIEF DESCRIPTION OF THE DRAWINGS

Incorporated herein are drawings that constitute a part of the specification and illustrate embodiments of the detailed description. The detailed description will now be described further with reference to the accompanying drawings as follows.

DETAILED DESCRIPTION

Figure 1:
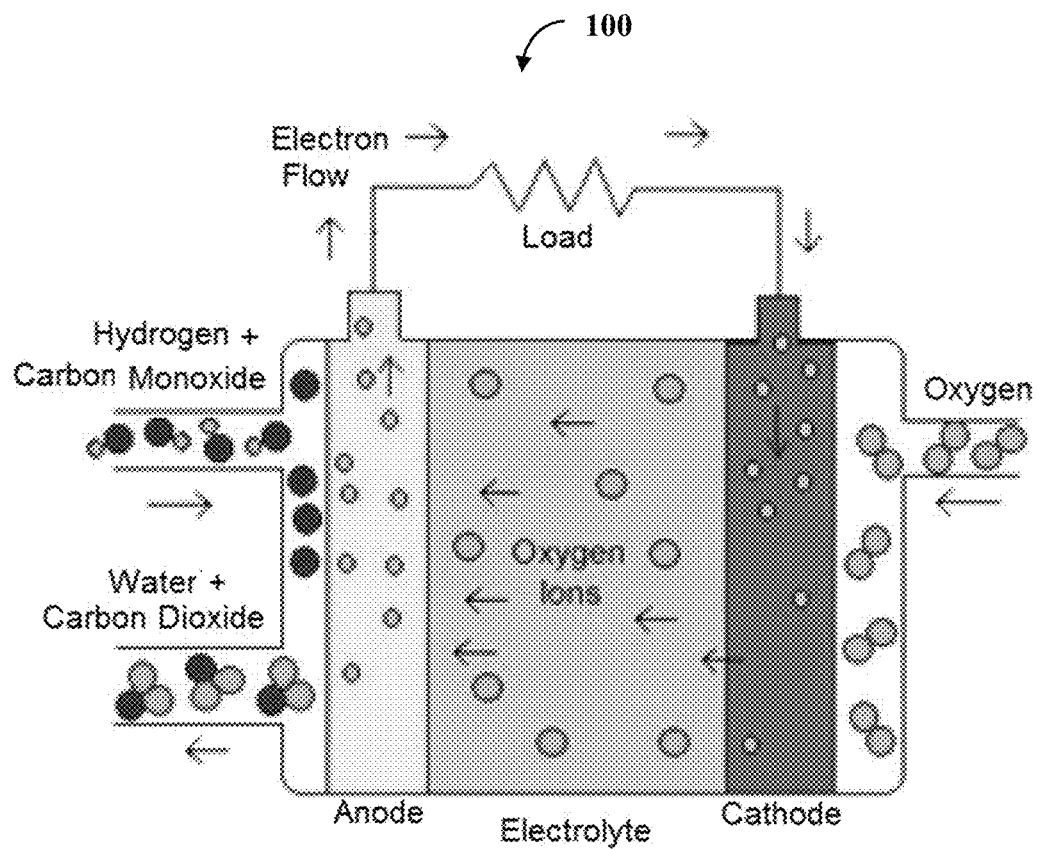
FIG. 1 illustrates one embodiment of a fuel cell.

A goal of oxidative fuel reforming can be to produce a product stream (e.g., reformate stream) that is rich in hydrogen and carbon monoxide. The overall simplified reactions associated with oxidative catalytic reforming comprise an oxidation reaction (exothermic reaction) Eq. 1, an endothermic steam reforming reaction (endothermic reaction) Eq. 2, and a water-gas-shift reaction (mildly exothermic reaction) Eq. 3.

$$C_nH_m + \frac{n}{2} \cdot O_2 \leftrightarrow n \cdot CO + \frac{m}{2} H_2 \qquad [1]$$

$$C_nH_m + n \cdot H_2O_{(g)} \leftrightarrow n \cdot CO + \left(\frac{m}{2} + n\right)H_2 \qquad [2]$$

$$CO + H_2O_{(g)} \leftrightarrow CO_2 + H_2 \qquad [3]$$

For many terrestrial applications, oxygen for a catalytic oxidative reaction comes from air. Air can comprise of approximately 78.08% nitrogen, approximately 20.95% oxygen, approximately 0.93% argon, approximately 0.035% carbon dioxide and approximately 0.005% other. Over 79% of air comprises gases that when reformed do not participate in reforming reactions. These additional gases place a burden on processing equipment (e.g., by way of parasitic power requirements), result in oversized hardware components which negatively impact system size, weight, cost and thermal losses. Increasing the oxygen content of air can improve the performance of fuel reformers by increasing reactant residence times, increasing reactant concentration, and eliminating energy consumed in heating non-reacting species (e.g. nitrogen). There are two primary approaches to oxygen-enrichment of air (although others may be used): polymeric membranes and ceramic membranes. Membranes can separate a feed gas (in this case, air) into an oxygen-enriched stream and a nitrogen-enriched stream through a number of mechanisms, such as: a pressure difference, a concentration difference, a chemical potential difference, or an electrical potential difference. Polymer membrane-based air intake systems operate at ambient temperatures and have been used successfully as oxygen enrichment systems for internal combustion engine applications and for nitrogen enrichment purposes providing an inert gas blanket in aircraft fuel compartments. Developments with both ceramic and polymeric membranes can make the application of oxygen enrichment of air for combustion and reforming purposes feasible and of practical interest.

In one embodiment, a catalytic reformer can be used to convert a gas with oxygen and a fuel into energy that is hydrogen rich or a hydrogen-based chemical compound. The catalytic reformer can have a preferred operating temperature and use part of the fuel to reach that preferred operating temperature. The remaining fuel can be used in energy production. When using an oxygen-enriched gas in comparison to air, less of the fuel can be used to bring the catalytic reformer to the preferred operating temperature and therefore more fuel can be used for energy production. Therefore, it can be preferable to use oxygen-enriched gas over air.

Further, when air is used with the catalytic reformer, a relatively large amount of nitrogen can be present in the reformer. Nitrogen can act as a diluent and can represent a large volume flow throughout the fuel processing system and fuel cell stack. With this nitrogen in the catalytic reformer, some of the fuel may not fully chemically react as a result of short residence times, low operating temperatures, and/or low reactant concentrations and, therefore, carbon compounds or sulfur present in fuels may cause irreparable damage to the catalytic reformer. Alternatively, the oxygen-enriched gas can be produced by nitrogen removal and the oxygen-enriched gas can be supplied to the catalytic reformer. With less nitrogen, more of the fuel can fully chemically react and, therefore, carbon and sulfur can form compounds that can be better tolerated by catalysts in the reformer (e.g. $CO$, $CO_2$, $H_2S$).

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs including separate applications or code from dynamically linked libraries.

FIG. 1 illustrates one embodiment of a fuel cell 100. The fuel cell 100 can be a solid oxide fuel cell. Fuel can be supplied to the fuel cell 100 in chemical form, such as hydrogen, carbon monoxide, or methane. The fuel cell 100 will be discussed below.

Figure 2:
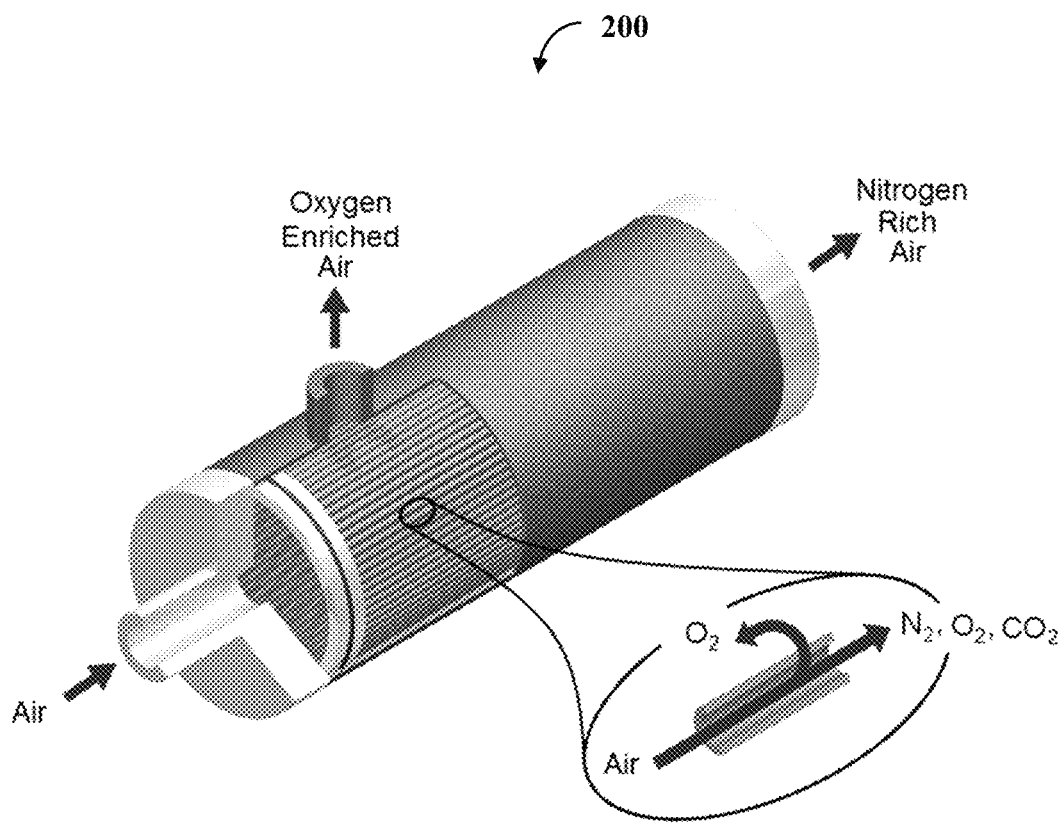
FIG. 2 illustrates one embodiment of a separator.

FIG. 2 illustrates one embodiment of a separator 200. The separator 200 can be used to separate air (e.g., gas with about 20.95% oxygen, about 78.09% nitrogen, and the remainder being about 0.96% other elements). The separator 200 can separate the air, in one embodiment, through use of a polymer membrane into an oxygen-enriched air and a nitrogen-enriched air. The enriched air can be gas that has a higher ratio of one type of gas than another gas types. To provide an academic example, the separator 200 can remove all of the nitrogen. This leaves the 95.62% of the oxygen and 4.38% of the other elements. The separator 200 may not change the quantity of the oxygen (e.g., moles or mass of oxygen), just the concentration of the produced gas that is the oxygen-enriched air.

Figure 3:
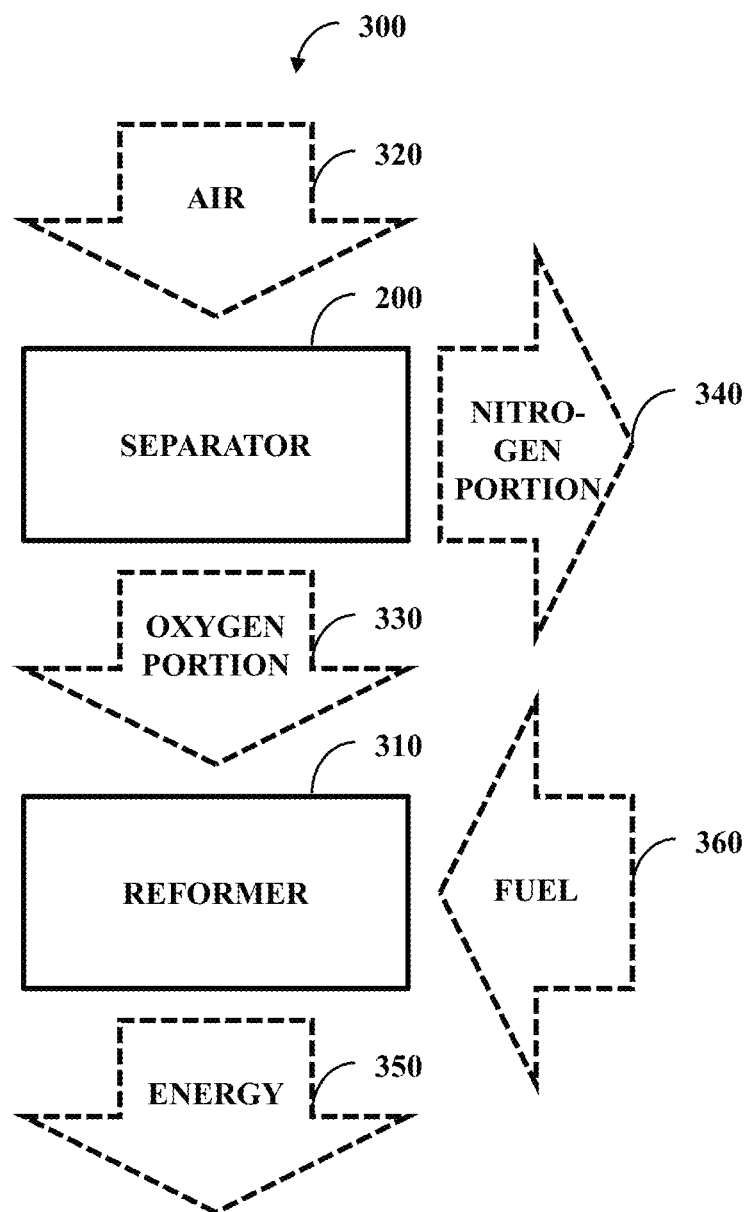
FIG. 3 illustrates one embodiment of the separator and a reformer.

FIG. 3 illustrates one embodiment of the separator 200 and a reformer 310. The separator 200 can be configured to separate an air 320 into an oxygen-enriched portion 330 (illustrated as oxygen portion 330) and a nitrogen-enriched portion 340 (illustrated as nitrogen portion 340). The oxygen-enriched portion 330 can be supplied to the reformer 310 while the nitrogen-enriched air can be discarded or used for another purpose. The reformer 310 can be configured to produce an energy 350 from at least a fuel 360 (e.g., singular fuel or blended fuel) and an oxygen-based gas such as the oxygen-enriched portion 330. Example reformer types for the reformer 310 can be a metal reformer or a ceramic reformer (e.g., the reformer 310 can comprise a shell layer, a ceramic mat layer, and a ceramic substrate layer). The energy 350 of the reformer can be supplied to the fuel cell 100 of FIG. 1. In one example, the energy 350 outputted from the reformer 310 can be hydrogen+carbon monoxide and this is shown as being entered into the fuel cell 100 of FIG. 1.

Example fuels that can be placed into the reformer 310 can include diesel, JP-5, JP-8, Jet A, kerosene, TS-1, or JP-4. The fuel 360 can include carbon as complex hydrocarbons, such as n-paraffin, iso-paraffin, cyclo-paraffin, mono-aromatics, and poly-aromatics. Depending on the fuel type different percentages of at least some of the above listed complex hydrocarbons can be present. Additionally, sulfur can be associated with these complex hydrocarbons at a percentage dependent on the fuel used. Examples of sulfur can include thiohene, dibenzo-thiohene, dimethylbenzo-thiophene, and trimethyl-benzothiophene.

A first portion of the fuel 360 can be burned (e.g., oxidized) to bring the reformer 310 to a specific temperature. At this specific temperature a second portion of the fuel 360 can be subjected to a chemical reaction to produce the energy 350. A third portion of the fuel 360 can fail to be burned and fail to be subjected to the chemical reaction. This third portion can be a reaction byproduct and can include carbon and/or sulfur that can build-up on a catalyst and/or react with catalyst materials of the reformer 310. Build-up of this carbon and/or sulfur can cause at least partial deactivation of the reformer 310 and this build-up can be irreversible. Therefore, it can be beneficial to have less unbound carbon and/or sulfur produced in conversion of the fuel 360 into the energy 350 by the reformer 310.

The separator 200 can reduce an amount of nitrogen supplied to the reformer 310 and this can lead to less carbon formation. Nitrogen may not participate in reforming reactions and may act as a diluent for reforming reactants. Nitrogen reduces reactant concentrations, reduces reactant residence time, and absorbs energy. These can have negative effects on the performance of the reformer 310. In addition, nitrogen can place a burden on system level processing equipment (e.g., parasitic power requirements), resulting in oversized components which negatively impact system size, weight, cost and thermal losses. Without having to process the nitrogen and/or having less nitrogen to process, the reformer 310 can become more efficient at producing the energy 350. Using the oxygen-enriched portion results in less nitrogen, less volume flow downstream (e.g., reduced component size and/or weight and less parasitic pumping power used), and more fuel available to create desired products (e.g., reformate) such as $H_2$ and CO as well as an increase in concentration of these products.

The reformer 310 can have a preferred operating temperature (actual temperature or a preferred temperature range) that can be a most optimal temperature for conversion of the fuel 360 into the energy 350. The less of the fuel 360 that is used to bring the reformer 310 to the preferred temperature the more fuel 360 that can be used to produce the energy 350. The reformer 310 can use the air 320 or the oxygen-enriched portion 330. In one embodiment, the reformer 310 is configured to use the oxygen-enriched portion 330 and a first quantity of the fuel 360 to create a set temperature and/or can be configured to use the air 320 and a second quantity of the fuel 360 to create the set temperature. The first quantity of the fuel 360 is smaller than the second quantity of fuel 360—therefore less of the fuel is used to create the set temperature (e.g., the preferred operating temperature) when using oxygen enriched air. With this embodiment, the fuel 360 can be used to produce the energy 350 by being brought to the set temperature. The set temperature can be a temperature (e.g., an optimal temperature) at which the fuel 360 chemically reacts in order to produce the energy 350. Since less of the fuel 360 is used with the oxygen-enriched portion 330 than the air 320 to reach the set temperature more of the fuel can be dedicated to energy production. To put another way, with oxygen-enriched portion 330, more of the fuel 360 is used to produce energy as opposed being used to reach the set temperature in comparison to reforming with air; reforming with the oxygen-enriched portion 330 can make the system 300 more efficient. Therefore, the reformer 310 can be configured to use more of the fuel 360 to produce the energy 350 with the oxygen-enriched portion 330 over the air 320 since less of the fuel 360 is used to create the set temperature. An amount of the energy 350 produced by the reformer 310 can be greater with the oxygen-enriched portion 330 than the air 320 since more of the fuel 360 is available because less of the fuel 360 is used to create the set temperature A simplified view of oxidative reforming can be depicted as a two-action process, with the first action comprising oxidizing (e.g., burning) reactions and the second action can comprise fuel reforming reactions. The first action of oxidation provides heat to bring the reformer to a desired temperature and to support reforming reactions of the second action. As described here, reforming reactions can be predominantly endothermic (e.g., require heat). Considering the above, a fixed quantity of the fuel 360 can be used by the reformer 310 under two different scenarios: (1) reforming using oxygen-enriched air, and (2) reforming with air. The first quantity of the fuel 360 (e.g., supporting oxidative reactions with the oxygen-enriched portion 330) and a third quantity of the fuel 360 (e.g., supporting reforming reactions with the oxygen-enriched portion 330) added together equals the single fuel quantity and, similarly, a second quantity of the fuel 360 (e.g., supporting oxidative reactions with the air 320) and a fourth quantity of the fuel 360 (e.g., supporting reforming reactions with the air 320) added together equals the single fuel quantity. Due to the first quantity of the fuel 360 (e.g., supporting oxidative reactions with the oxygen-enriched portion 330) being smaller than the second quantity of fuel 360 (e.g., supporting oxidative reactions with the air 320), the third quantity of the fuel 350 (e.g., supporting reforming reactions with the oxygen-enriched portion 330) is greater than the fourth quantity of fuel 350 (e.g., supporting reforming reactions with the air 320). The reformer 310 can be configured to use the third quantity of the fuel 360 (e.g., supporting reforming reactions with the oxygen-enriched portion 330) to produce the energy 350 and can be configured to use the fourth quantity of the fuel 360 (e.g., supporting reforming reactions with the air 320) to produce the energy 350. In view of this, the reformer 310 can take a total quantity of the fuel 360 and use one part of the fuel to reach the set temperature and another part of the fuel 360 to produce the energy 350. If less of the fuel 360 is used to reach the set temperature, then more of the fuel can be used for production of the energy 350. Therefore, for a fixed quantity of fuel 360, more energy 350 can be produced with oxygen-enriched air than can be produced with air alone.

Capacity (e.g., through-put or process thermal rating) of the reformer 310 can also be significantly improved by using the oxygen-enriched portion 330. A capacity of the reformer 310 using the oxygen-enriched portion 330 can be greater than a capacity of the reformer 310 using the air 320 since the nitrogen is reduced (e.g., at least partially removed). The energy 350 produced by the reformer 310 from the fuel 360 and the oxygen-enriched portion 330 can be greater than an energy produced by the reformer 310 from the fuel 360 and the air 320. As discussed above, the air 320 can be about 20.95% oxygen and about 78.09% nitrogen. For example purposes, this can be addressed as air being 20% oxygen and 80% nitrogen. If all the nitrogen is removed, then the oxygen concentration can be approximately five times greater for the oxygen-enriched portion 330 than air 320 with the same quantity (e.g., moles or mass) of oxygen being provided.

In one embodiment, a first reaction time (e.g., residence time or space time) in the reformer 310 with the oxygen-enriched portion 330 is longer than a second reaction time in the reformer with the air 320. Reaction time can be an average time a substance would reside within the reformer 310. This time can be mathematically defined as the reformer volume divided by the volume flow into the reformer 310. The reaction times as well as reactant concentrations can have an important influence on reaction kinetics that directly affect the production of the energy 350. The first and second reaction times are average lengths of time that the fuel 360, air 320 (or enriched-oxygen air 330) have to react within the reformer 310. A lesser amount of a catalyst-detrimental element (e.g., carbon or sulfur compounds) is produced from a reaction over the first reaction time (e.g., with oxygen-enriched air 330) than from the reaction over the second reaction time (e.g., with air 320). A carbon or sulfur detrimental element can be a carbon or sulfur containing molecular species or element that can react with a reforming catalyst or attach to a reforming catalyst, degrading or destroying catalytic activity (e.g., poisoning the catalysts). Longer reaction times directly help to fully convert the fuel 360 which minimizes the production of compounds that lead to carbon formation and deactivation of catalysts. A prominent contribution of oxygen-enrichment to sulfur removal is that oxygen enrichment results in higher hydrogen concentrations in the reformer 310 which removes elemental sulfur by: $H_2+S \rightarrow H_2S$; thus preventing sulfur from forming metal sulfides with catalysts and deactivating catalysts. Increased residence time can also positively influence the above reaction. With the oxygen-enriched portion 330 there is a longer reaction time and in turn more fuel is produced to the energy 350 while less of the fuel 360 remains un-reacted. With less of the fuel 360 being un-reacted, less of the catalyst-detrimental element is produced. Less production of the catalyst-detrimental element can mean less irreversible damage to the reformer 310.

As discussed above, the separator 200 can separate the oxygen-enriched portion 330 and the nitrogen-enriched portion 340 from the air 320. With the oxygen-enriched portion 330 and the fuel 360, the reformer can produce hydrogen through chemical reactions. In fuel reforming, where oxygen is obtained from air, nitrogen in air acts simply as a diluent for the products of reformation (e.g., energy 350). With oxygen-enrichment, less nitrogen is provided to the reformer 310, resulting in higher reactant (e.g., fuel, water, oxygen-enriched air) concentrations within the reformer 310 that produces higher hydrogen concentrations in the energy 350.

Figure 4:
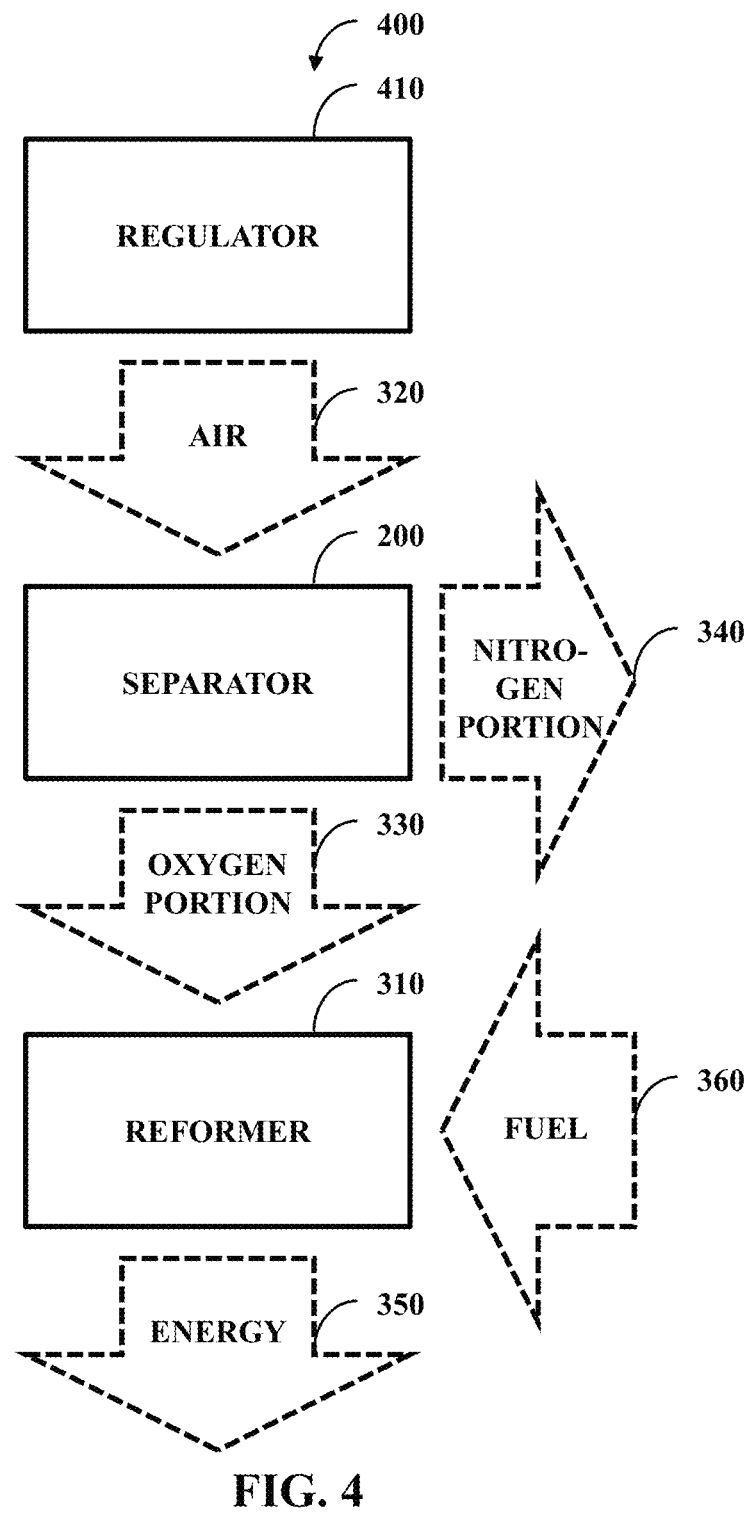
FIG. 4 illustrates one embodiment of a system comprising a regulator, the separator, and the reformer.

FIG. 4 illustrates one embodiment of a system comprising a regulator 410, the separator 200, and the reformer 310. The regulator 410 can be configured to regulate a flow rate (e.g., volume over time) and pressure (e.g., pounds per square inch) of the oxygen-enriched portion to the reformer 310. While depicted as regulating flow rate and pressure of the air 320 to the separator 200, the regulator 410 can physically function between the separator 200 and the reformer 310 to regulate the flow rate and concentration of oxygen in the oxygen-enriched portion 330. However, the separator 200 may function such that it operates based on differential pressure produced from the regulator 410. The regulator 410 can comprise a valve to physically and actively manage how the flow and pressure occurs in accordance with the flow rate and desired oxygen concentration as well as various components, such as an identification component and a determination component, and a controller. The identification component, the determination component, the controller, or a combination thereof can be implemented separate from the regulator 410. The identification component can be configured to identify a preferred temperature for the reformer 310 with regard to fuel efficiency. The determination component can be configured to determine specific flow rate and oxygen concentration values to cause the reformer 310 to function at the preferred temperature. The controller can cause the regulator 410 to use the specific flow rate value as the flow rate. The regulator 410 can also regulate flow of the fuel 360 based upon demand.

The fuel 360 can be a specific fuel type that functions most effectively at a set temperature. The identification component can identify this temperature by, for example, sending a request to a fuel supply unit for fuel information and reading a response. The determination component can determine the specific flow rate through calculation. In one example, the identification can be that the fuel 360 functions most efficiently at X degrees. The determination component can determine how much of the oxygen-enriched portion 330 per second (a rate), based on oxygen concentration (otherwise known as oxygen enrichment) the reformer 310 would use to reach the temperature (e.g., without having to use the fuel 360 to reach temperature). The controller can cause the regulator 410 to use this rate.

The system 400 can function with feedback capabilities. In one example, if the reformer 310 is functioning at too hot of a temperature, then the regulator 410 can lower the air flow rate. If the reformer 310 is then using too much of the fuel 360 to reach the temperature, then the regulator 410 can increase the air pressure which will increase the oxygen concentration from the separator (e.g., increased oxygen enrichment).

Figure 5:
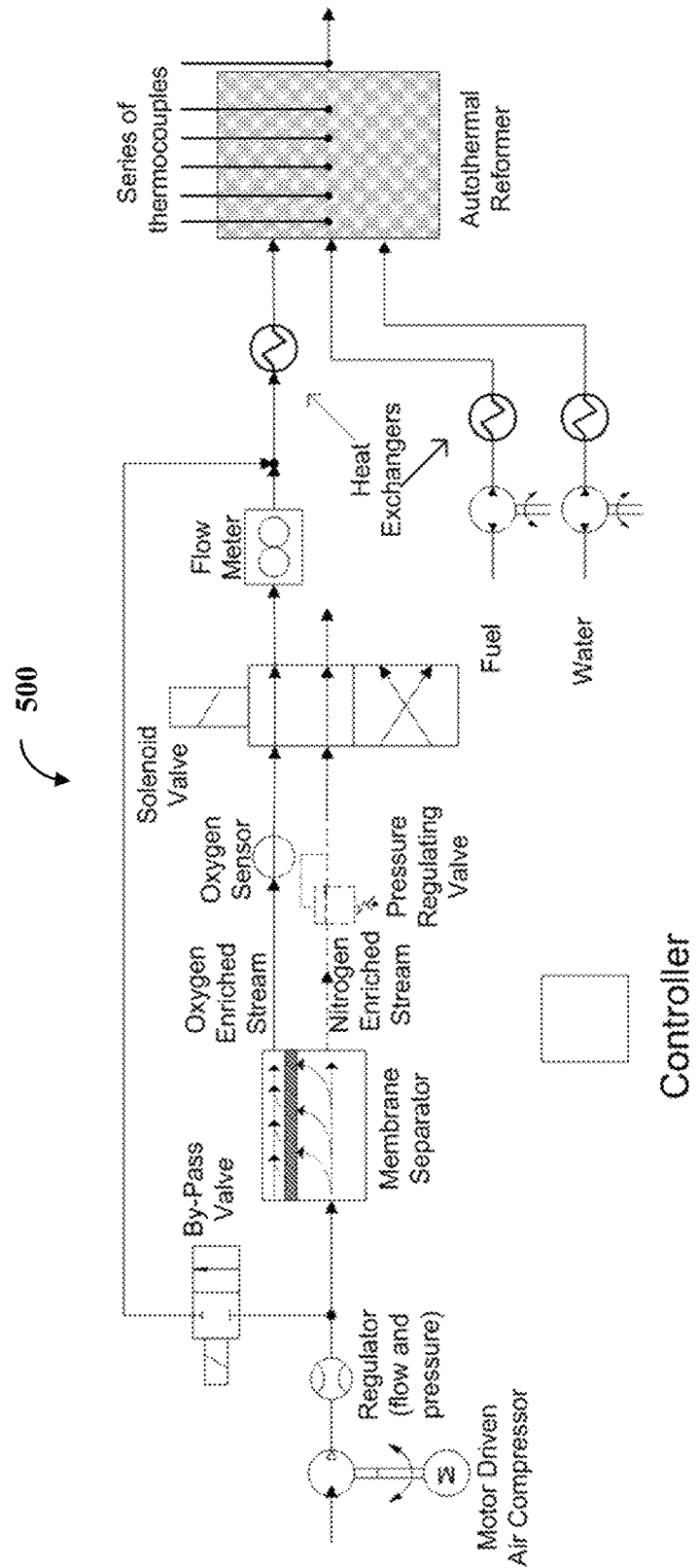
FIG. 5 illustrates one embodiment of a fuel environment.

FIG. 5 illustrates one embodiment of a fuel system 500. The fuel system 500 can be considered an oxygen-enriched fuel reforming system. The fuel system 500 can function in accordance with various aspects disclosed herein to produce the energy 350 of FIG. 3. In one example, the membrane separator shown in the fuel system 500 can be the separator 200 of FIG. 2 and the autothermal reformer is the reformer 310 of FIG. 3. This fuel system 500 can be used to practice oxygen-enriched autothermal fuel reforming. Use of the fuel system 500 can produce, by way of the membrane separator, the oxygen-enriched portion 330 of FIG. 3 from air 320 of FIG. 3. Use of the membrane separator can lead to reduced parasitic pumping losses which increase reforming efficiency, reduced element size for an element of the fuel system 500 and/or can produce a drop in pressure of the fuel system 500. In addition, use of the membrane seperator can lead to increased reformer operating temperature (e.g., optimize reformer temperature with fuel provided), increase reactant resident time (e.g., match reactant resident time with fuel provided), and an increased hydrogen partial pressure within the reformer 310 of FIG. 3.

With the fuel system 500 two regulators are illustrated—a regulator before the membrane separator and a pressure regulating valve. Either one of these can be considered the regulator 410 of FIG. 4. In addition, the combination of the two can also be considered the regulator 410 of FIG. 4. Further, the regulator 410 of FIG. 4 discusses control capabilities and these control capabilities can be performed, in one embodiment, by the controller illustrated as part of the fuel system 500. Therefore, the regulator illustrated as part of FIG. 5 can be a mechanical regulator.

Figure 6:
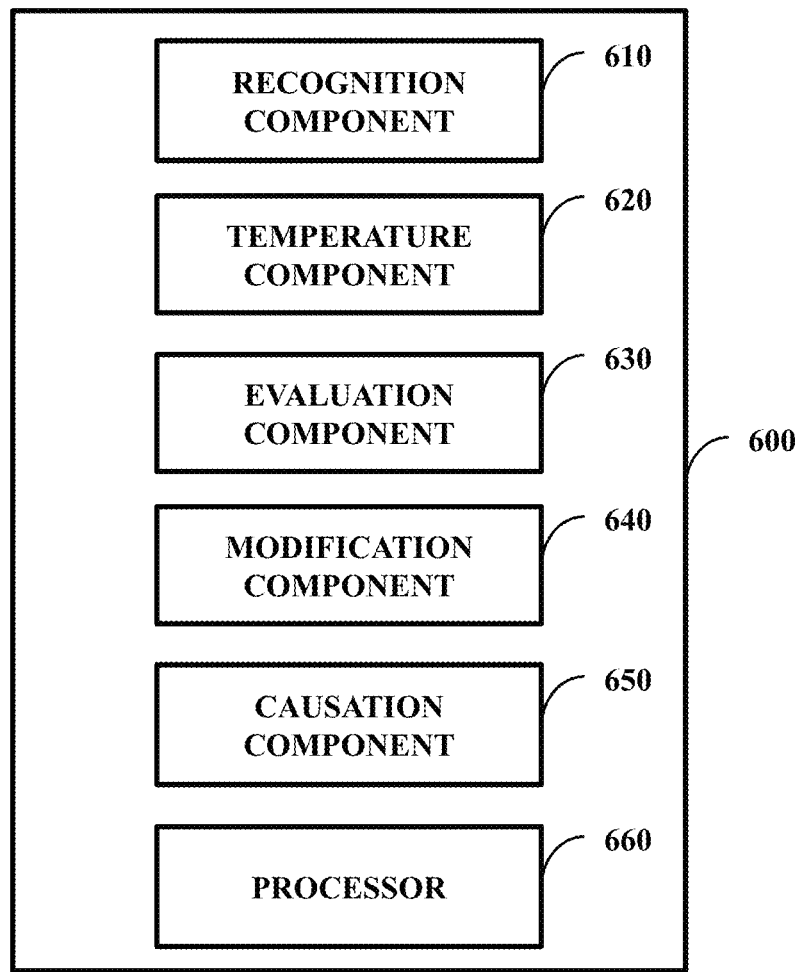
FIG. 6 illustrates one embodiment of a system comprising a recognition component, a temperature component, an evaluation component, a modification component, a causation component, and a processor.

FIG. 6 illustrates one embodiment of a system 600 comprising a recognition component 610, a temperature component 620, an evaluation component 630, a modification component 640, a causation component 650, and a processor 660. The recognition component 610 can recognize an operational temperature of a reformer (e.g., the reformer 310 of FIG. 3). The temperature component 620 can determine that the operational temperature of the fuel cell is not a desired temperature of the reformer. The desired temperature of the reformer can be a specific temperature or a temperature range while the operational temperature can be too hot or too cold. The evaluation component 630 can evaluate the operational temperature against the desired temperature to produce an evaluation result. The modification component 640 can determine how to modify a supply metric for the reformer to achieve the desired temperature of the reformer based, at least in part, on the evaluation result. In one example, the evaluation result can be that the operational temperature is not hot enough. In view of this, the modification component 640 can determine that an optimal way to raise the operational temperature is by increasing oxygen concentration of an oxygen-enriched gas to the reformer. The causation component 650 can cause implementation of the supply metric in modified form, such as causing the enrichment concentration to be increased. The processor 660 can execute at least one instruction associated with the recognition component, the temperature component, the evaluation component, the modification component, the causation component, or a combination thereof.

In an illustrative example, the system 600 can monitor operation of the reformer and as part of this monitoring can determine that the operational temperature is too high. Based on this high temperature, the modification component 640 can select an oxygen enrichment level of oxygen-enriched gas as the supply metric to change. Depending on logic used by the system 600, the oxygen enrichment level can be either increased or decreased.

The operational temperature can be higher or lower than the desired temperature such that the operational temperature indicates that an undesirable product is produced at a level that is unacceptable. Initially, a higher operating temperature can indicate that the undesirable product is produced. An example of this can be the initial selective deactivation of catalysts towards endothermic reactions, resulting in a temperature rise. This can be considered a short term result. After a period of time, the undesirable product begins to completely deactivate the catalyst of the reformer 310 of FIG. 3. With this complete deactivation, both endothermic and exothermic reactions are degraded and the operational temperature can become lower over the longer term. The system 600 can function such that a change in the operational temperature, either higher or lower, can be interpreted as a formation of the undesirable product and corrective action can then be taken.

The undesirable product can be graphic carbon. Olefins can be a precursor for formation of graphic carbon. An increase or decrease in temperature of the reformer 310 of FIG. 1, such as an increase or decrease without changing a supply metric, can be an indicator that olefins are being produced and in turn that graphic carbon is being produced. Prolonged exposure to graphic carbon can cause irrevocable damage to the reformer 310 of FIG. 3. With this, a rise or drop in operational temperature against the desired temperature can be indicative that olefins are being produced and the system 600 can function to lower olefin concentration and ultimately to eliminate the graphic carbon within the reformer 310 of FIG. 3. In one example, when the temperature component 620 determines that the temperature is too high or too low, the evaluation component 630 and the modification component 640 can process information to determine how to correct this situation. As an example, the evaluation component 630 and the modification component 640 can conclude that if the oxygen enrichment level were greater, then less olefins would be produced and in turn the operational temperature would be lowered or raised. Therefore, the supply metric can be modified such that the oxygen enrichment level for the oxygen-enriched gas is increased and thus the undesirable product is produced at a level that is acceptable.

The oxygen-enriched gas, as opposed to air, can result in an increase in hydrogen concentration, as well as an increase in concentration of other elements (e.g., non-nitrogen elements), in the reformer 310 of FIG. 3 and downstream of the reformer 310 of FIG. 3. Increased hydrogen concentration within the reformer 310 promotes hydrogen reduction of undesirable products (e.g. carbon and sulfur). At least part of the hydrogen chemically interacts with the undesirable product to lower a permanent negative impact on the reformer 310 of FIG. 3 from the undesirable products. With this chemical interaction, at least part of the undesirable product can be mitigated and not impact the reformer 310 of FIG. 3.

Figure 7:
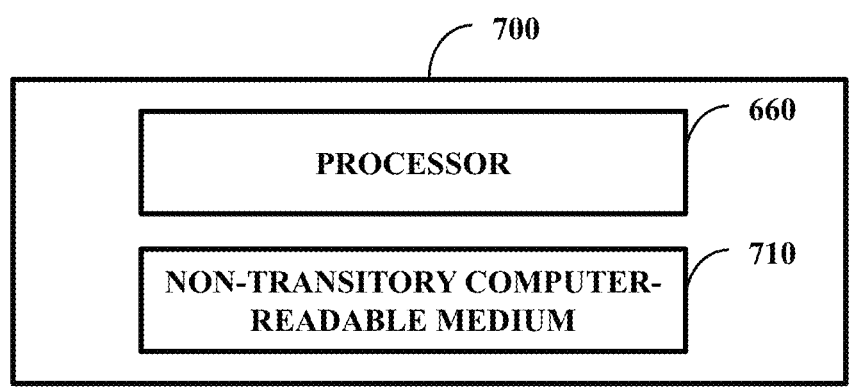
FIG. 7 illustrates one embodiment of a system comprising the processor and a non-transitory computer-readable medium.

FIG. 7 illustrates one embodiment of a system 700 comprising the processor 660 (e.g., a general purpose processor or a processor specifically designed for function in the fuel system 500 of FIG. 5, such as at least part of the controller) and a non-transitory computer-readable medium 710. In one embodiment, the computer-readable medium 710 is communicatively coupled to the processor 660 and stores a command set executable by the processor 660 to facilitate operation of at least one component disclosed herein (e.g., the recognition component 610 of FIG. 6). In one embodiment, at least one component disclosed herein (e.g., the temperature component 620 of FIG. 6) can be implemented, at least in part, by way of non-software, such as implemented as hardware by way of the system 700. In one embodiment, the computer-readable medium 710 is configured to store processor-executable instructions that when executed by the processor 660 cause the processor 660 to perform a method disclosed herein (e.g., the methods 800-1000 addressed below). In one example, the computer-readable medium 710 and the processor 660 form at least part of a fuel processing controller (e.g., the controller illustrated in the system 500 of FIG. 5 that manages at least part of the remaining system 500 of FIG. 5). The fuel processing controller can perform a method disclosed herein.

Figure 8:
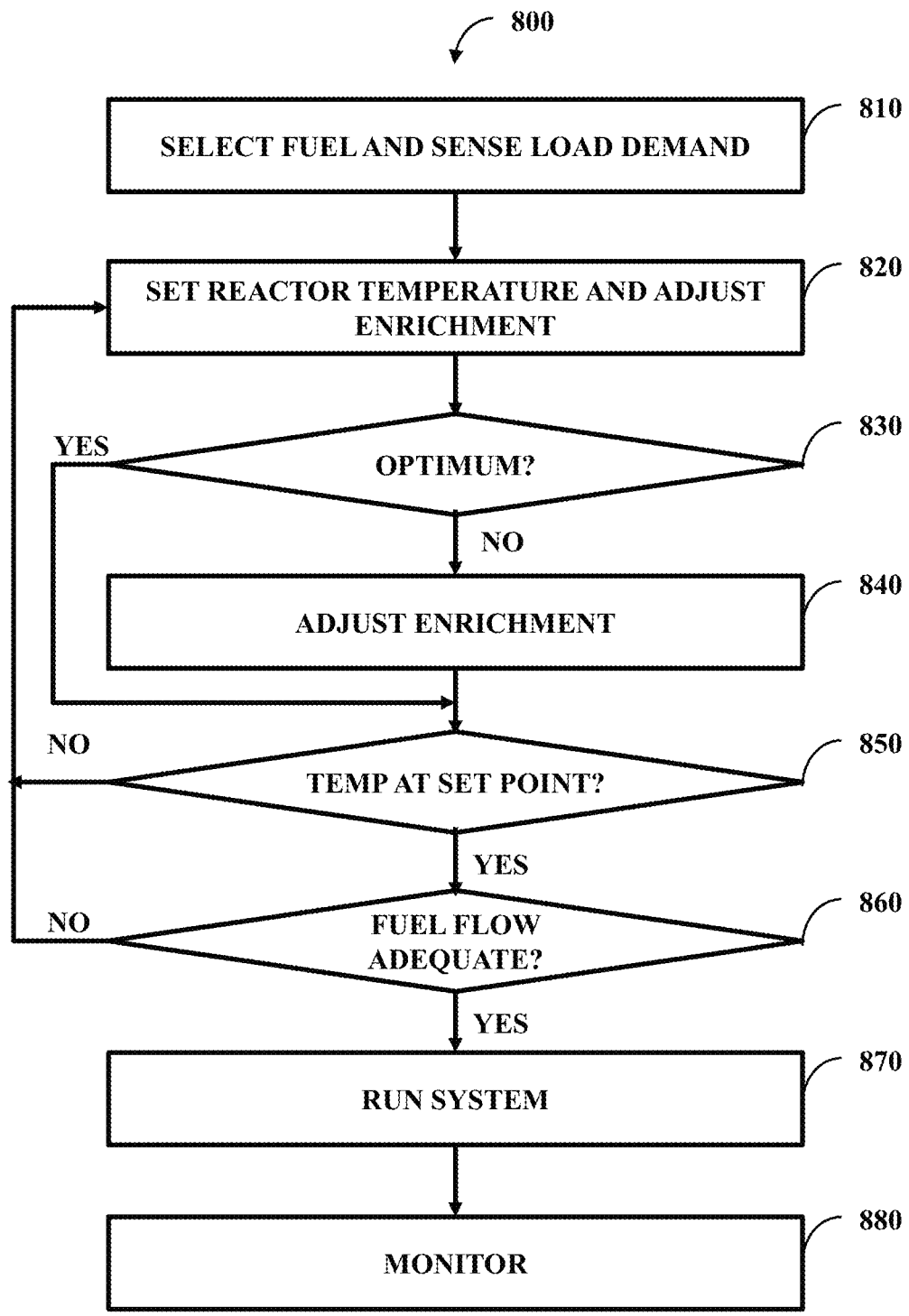
FIG. 8 illustrates one embodiment of a method comprising eight blocks.

FIG. 8 illustrates one embodiment of a method 800 comprising eight blocks 810-880. The method 800 can be configured to be performed, at least in part, by at least part of the fuel system 500 of FIG. 5. In one example, the fuel processing controller can perform at least part of the method 800.

At 810 a fuel can be selected and/or identified (e.g. identifying a fuel type for the fuel system 500 of FIG. 5). In one example, a reformer (e.g., the reformer 310 of FIG. 3) can be configured to work with multiple fuel types. Depending on the fuel type, the reformer can have an optimum (or other beneficial or improved) reformer temperature as well as a minimum residence time. Also at 810, a load demand can be sensed for the fuel system 500 of FIG. 1. This load demand can set a fuel flow rate, oxygen-to-carbon ratio, minimum residence time (e.g., determined from fuel type), and optimum oxygen enrichment. Part of sensing the load demand can be identifying a desired residence time for a reaction set of the reformer that is part of the fuel system 500 of FIG. 5 and/or setting the desired residence time based, at least in part, on the fuel type.

At 820, the reformer temperature can be set (e.g., setting an operational temperature of the reformer by way of a molar oxygen-to-carbon ratio, where the temperature of the reformer influences the desired residence time for the reaction set). This can be done through adjusting a molar oxygen-to-carbon ratio by way of flow rate to achieve this reformer temperature. Additionally at 820, oxygen-enrichment level can be adjusted to meet the minimum residence time.

At 830, a check can take place to determine if the oxygen enrichment matches the optimum value for the residence time associated with the fuel type. If not, then the method 800 can continue to 840 to adjust the enrichment for optimization. After 840 occurs or if the check 830 determines that the enrichment is at an optimum, check 850 can occur to determine if the temperature is at a set point (e.g., optimum reformer temperature). If the temperature is not at a set point, then the method 800 can return to 820 to reset the reformer temperature. A similar check 860 can occur to determine if the fuel flow rate is correct. If not, then the fuel flow rate can be adjusted (e.g., as part of 860) and the method can return to 820 for modification if appropriate.

Once the checks 830 and 850-860 determine modification is not appropriate, then the fuel system 500 of FIG. 5 can run at 870. As part of 870 there can be causing the reformer to be supplied with a matter state at an oxygen-enrichment level to meet the desired residence time and/or causing the reformer to be supplied with a fuel at a fuel rate, where the reformer uses the fuel and the matter state to perform the reaction set. The oxygen-enrichment level of the matter state can be higher than an oxygen-enrichment level of air. The matter state can be produced from supplying the air through a separator that produces the matter state at the oxygen-enrichment level that is higher than air and that produces a matter state with a nitrogen-enrichment level that is higher than air The reformer can be monitored at 880 (e.g., monitored periodically, such as every X seconds where X is an integer). As part of this monitoring a temperature of the reformer can be monitored. As a result, a modification can occur (e.g., the method 800 can return from 880 to 820 or 840) such as an oxygen-enrichment level. With this, 880 can comprise checking if the reaction set is functioning with the desired residence time (e.g., by way of measuring inlet flow rate of the reformer 310 of FIG. 3). When the method 800 returns to 820 determining how to change the oxygen-enrichment level to meet the desired residence time and supply of a matter state at the oxygen-enrichment level in view of the change to meet the desired residence time can occur.

Figure 9:
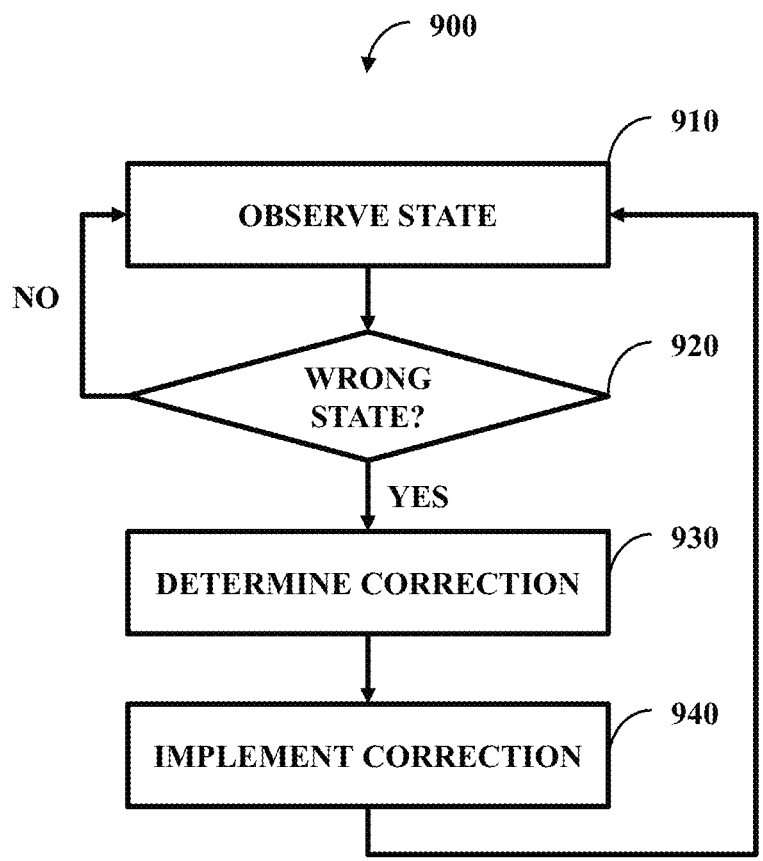
FIG. 9 illustrates one embodiment of a method comprising four blocks.

FIG. 9 illustrates one embodiment of a method 900 comprising four blocks 910-940. At 910 a state of the reformer 310 of FIG. 3 can be observed. In one example, a temperature of the reformer 310 of FIG. 3 can be observed to determine carbon production or carbon production can be monitored by way of another manner. A check can take place at 920 to determine if the state is acceptable, such as being in an acceptable range. If the check results such that the state is acceptable (e.g., a correct state), then observation can continue and in essence actions 910 and 920 can loop continuously. If the check results such that the state is not acceptable (e.g., a wrong state), then there can be a determination on what correction to make at 930. This determination can be based on the actual state, deviation from an acceptable state, available corrective measures, etc. This correction can be implemented at 940 and the method 900 can return to 910 (e.g., even as 930 and 940 observation at 910 continues or observation at 910 pauses when the check results in the state being not acceptable and then resumes after implementation 940). Returning to the temperature example discussed earlier in this paragraph, if the temperature is too high or too low, then a determination can be made to increase oxygen enrichment level, air flow level, etc. and a correction based on this determination can be implemented. This determination can have a goal of making the state acceptable in a shortest amount of time, using a fewest amount of resources, etc.

Figure 10:
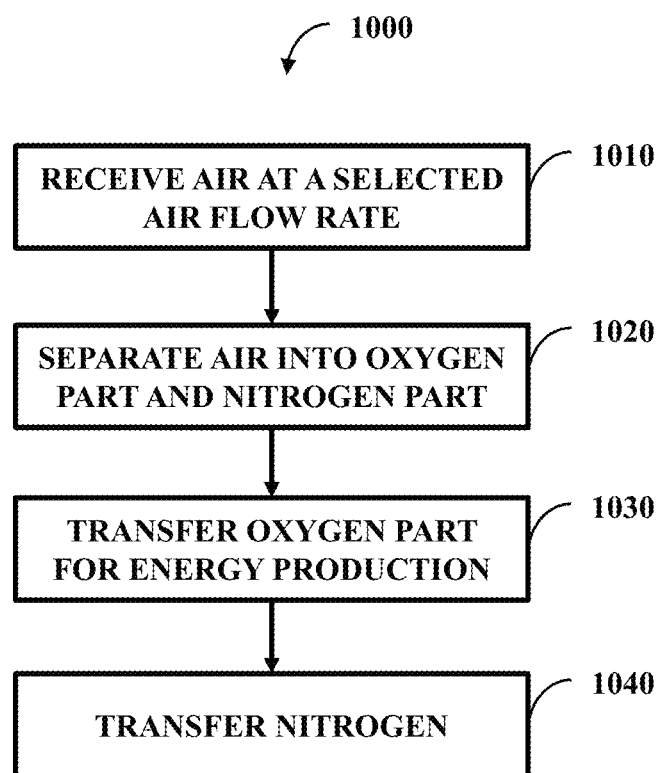
FIG. 10 illustrates one embodiment of a method comprising four blocks.

FIG. 10 illustrates one embodiment of a method 1000 comprising four blocks 1010-1040. The method 1000 can be how the separator 200 of FIG. 2 operates. At 1010 the separator 200 of FIG. 2 can receive air. This air can be at an air flow rate and pressure selected by a component disclosed herein, such as selected for a certain performance from the reformer 310 of FIG. 3. The separator 200 of FIG. 2 can separate the air into an oxygen-enriched part and a nitrogen-enriched part at 1020. This separation may not be complete separation in that the oxygen-enriched part will have some nitrogen and the nitrogen-enriched part will have some oxygen, but the concentrations will be improved (e.g., enriched). At 1030 the oxygen part can be transferred to the reformer 310 of FIG. 3 for use in energy production while at 1040 the nitrogen-enriched part can be transferred away from the reformer 310 of FIG. 3, such as put in a fuel tank over air for safety purposes or used in bed purging.

While the methods disclosed herein are shown and described as a series of blocks, it is to be appreciated by one of ordinary skill in the art that the methods are not restricted by the order of the blocks, as some blocks can take place in different orders. Similarly, a block can operate concurrently with at least one other block.

Figure 11:
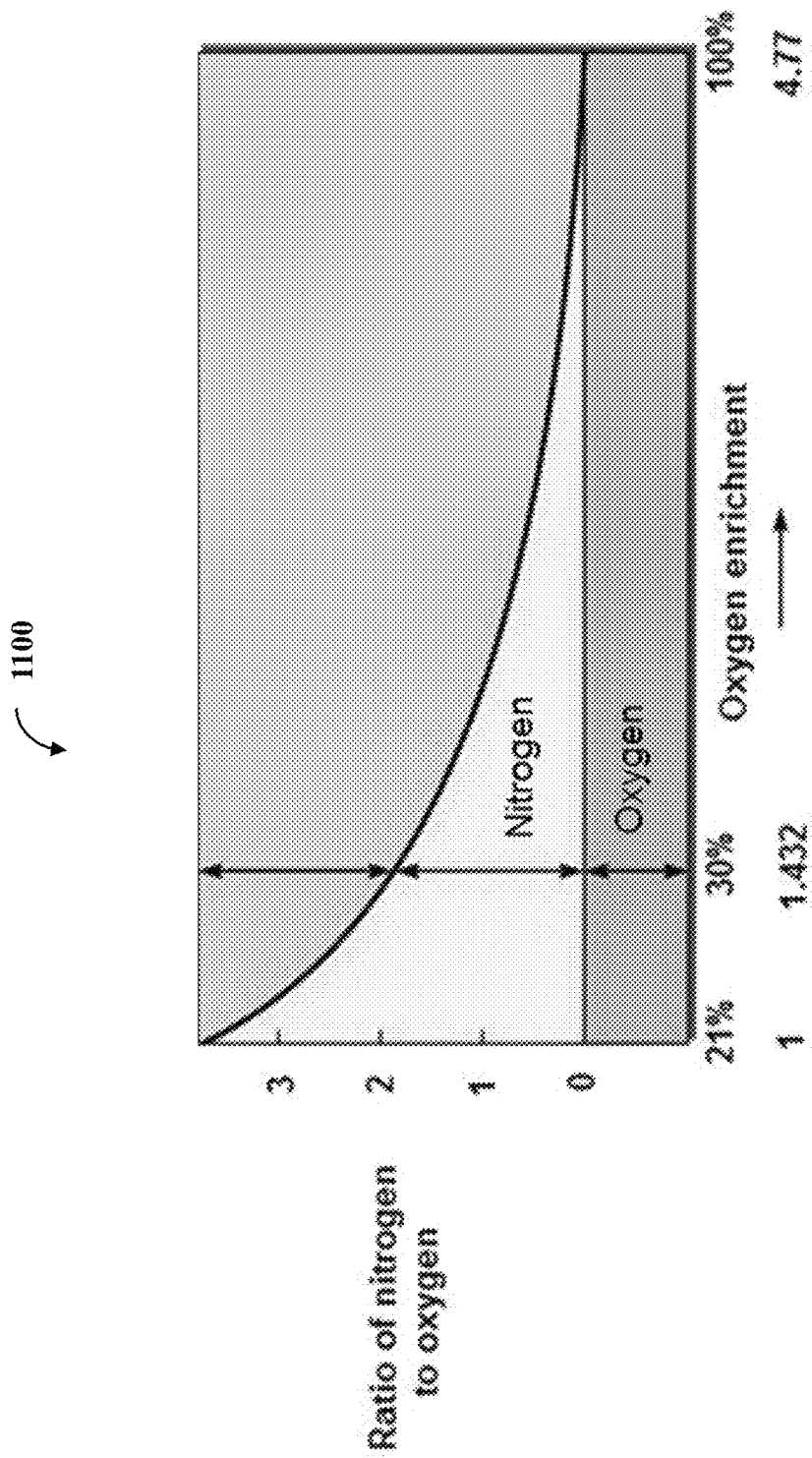
FIGS. 11-22B illustrate embodiments of various charts.

FIG. 11 illustrates one embodiment of a chart 1100. The chart 1100 shows the oxygen and nitrogen portions from the air 320 of FIG. 1. As the nitrogen is removed, the ratio of nitrogen-to-oxygen decreases while the oxygen enrichment increases.

Figure 12A:
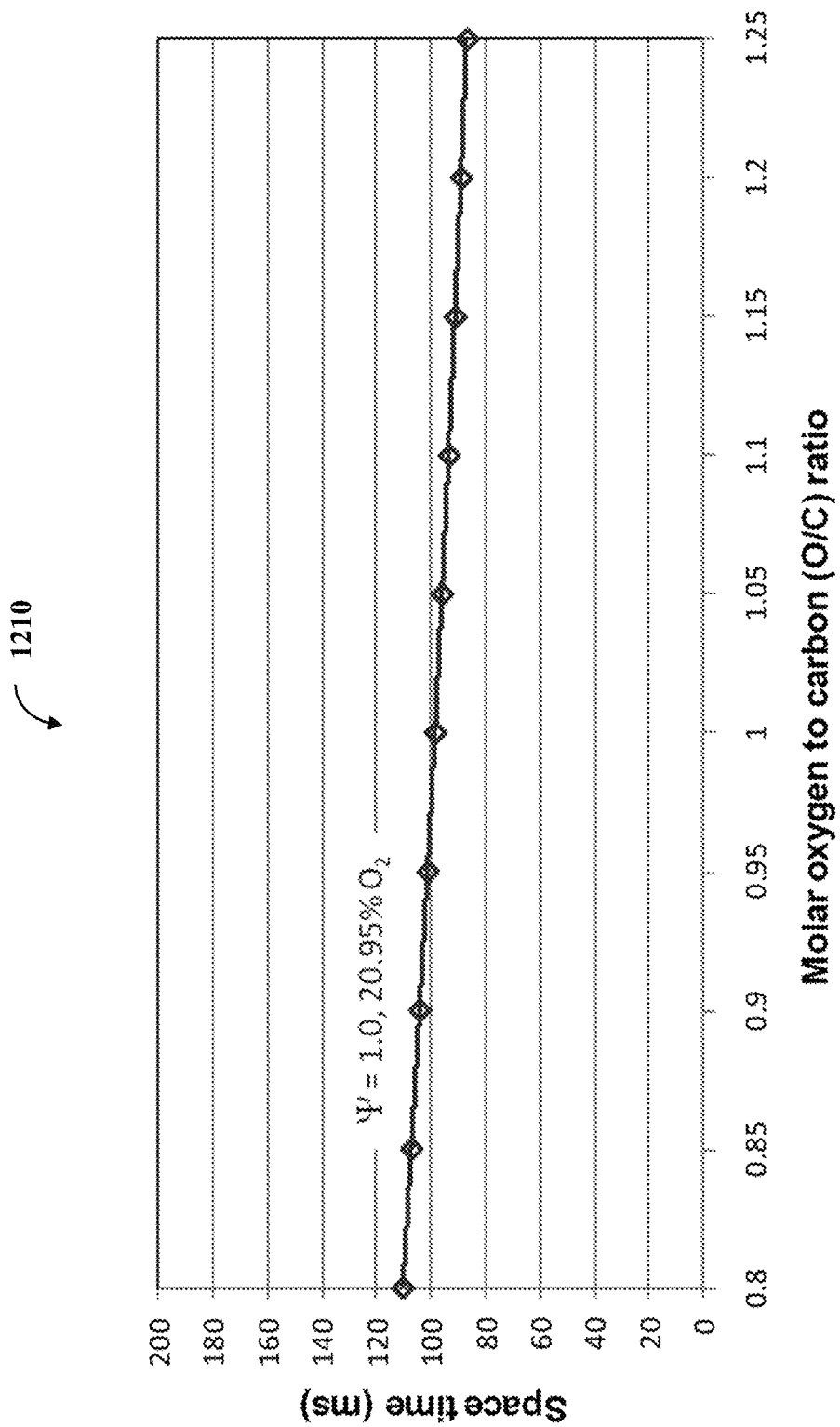
Figure 12B:
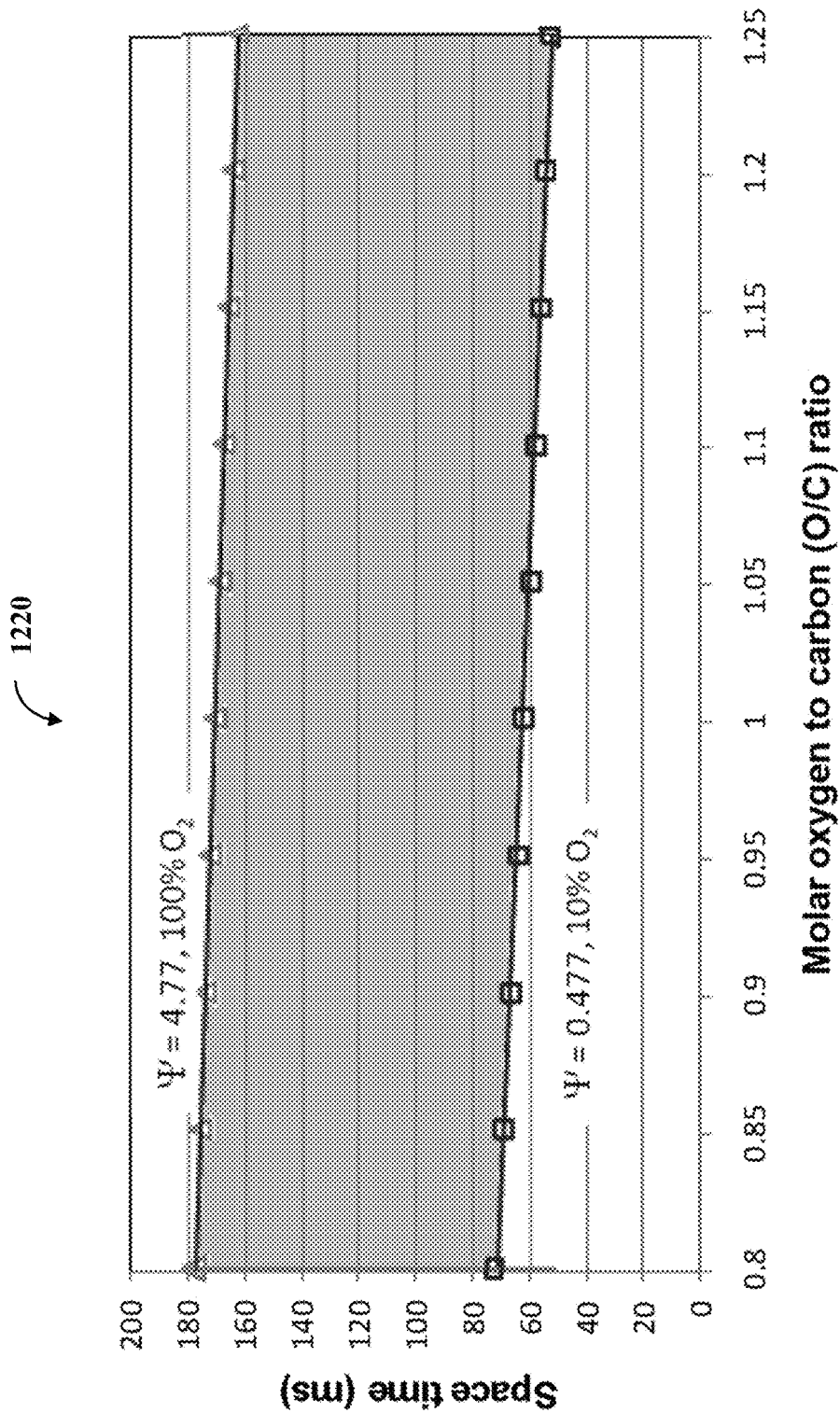
Figure 13A:
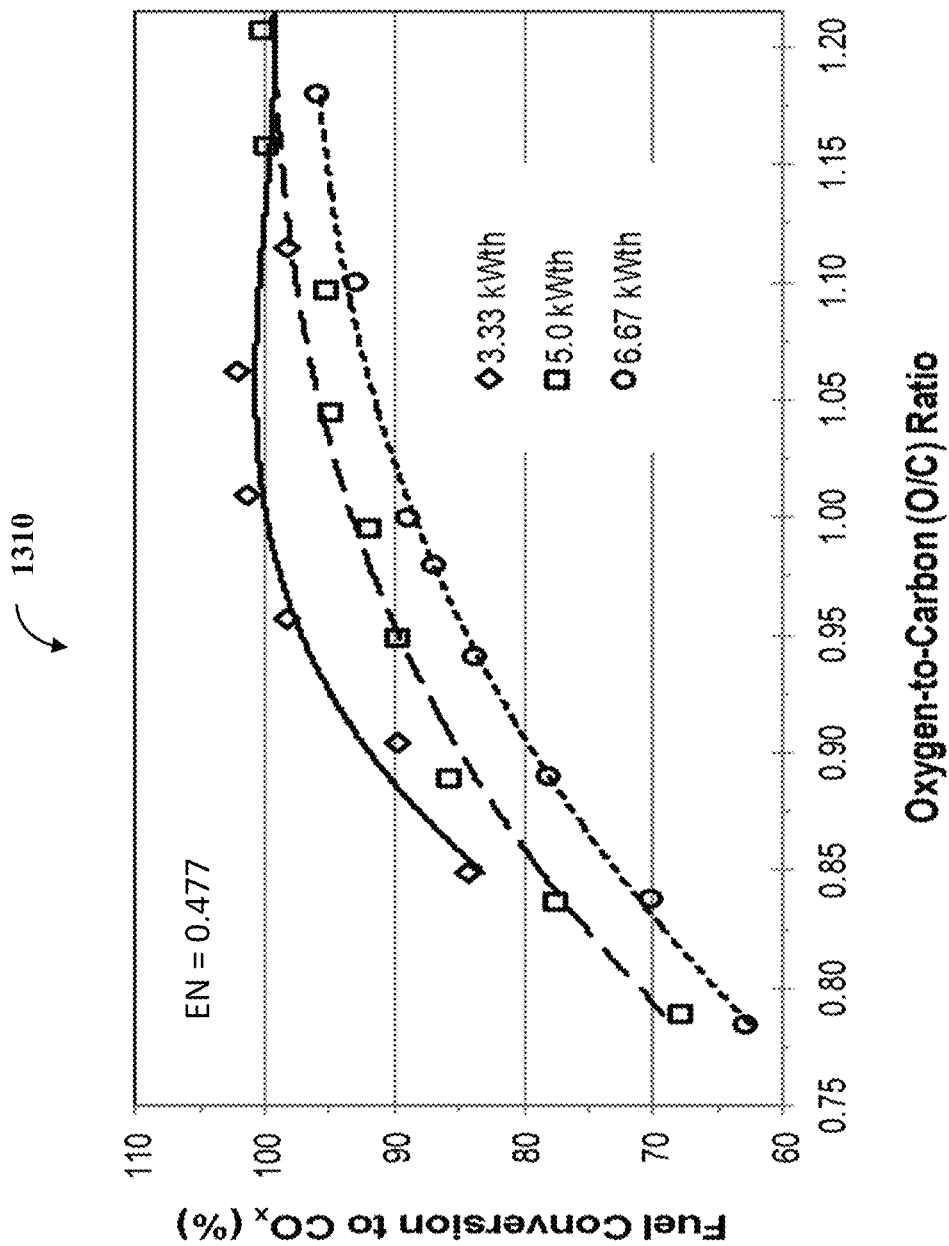
Figure 13B:
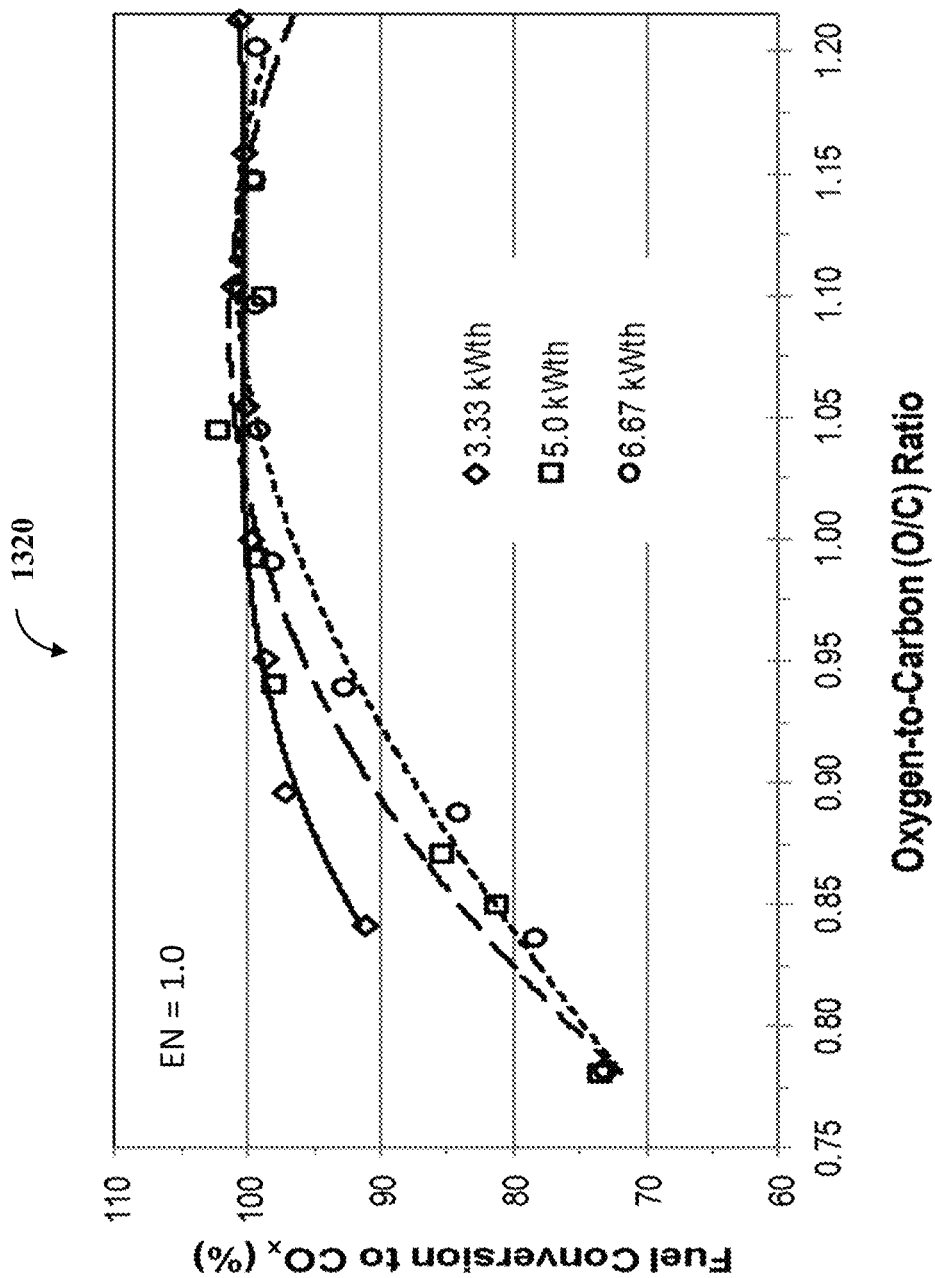
Figure 13C:
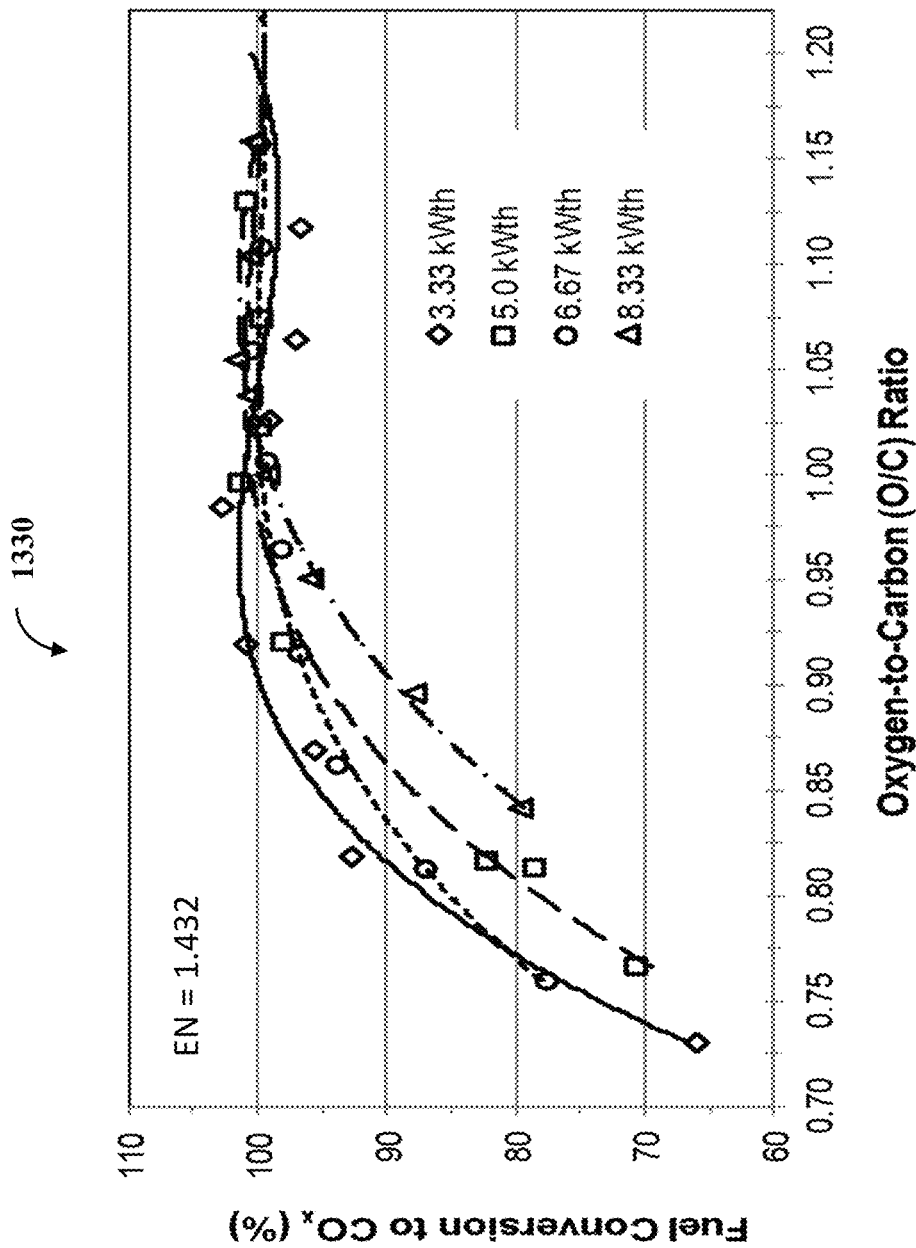
Figure 13D:
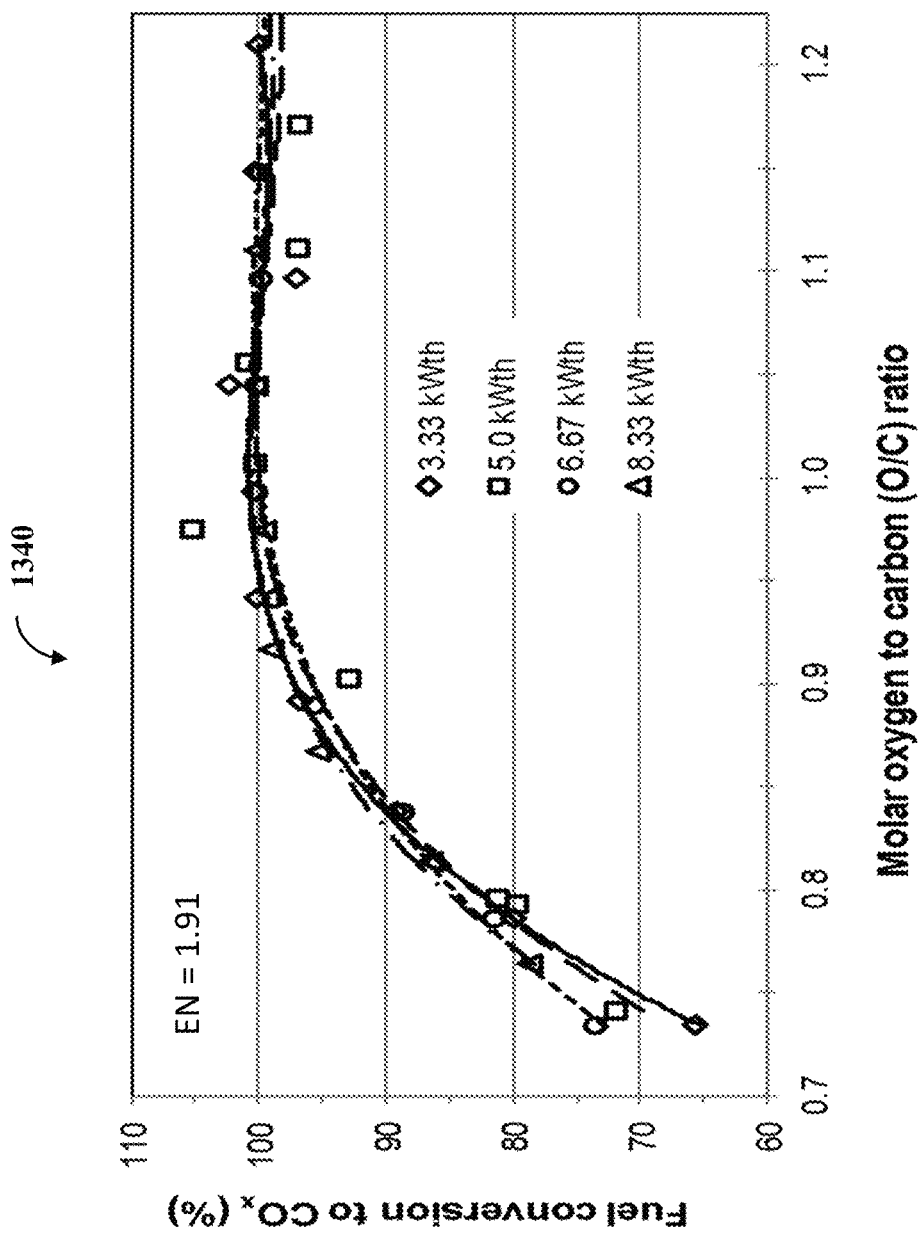

FIGS. 12A-B illustrate one embodiment of two charts 1210 and 1220. The chart 1210 addresses a relationship between molar oxygen to carbon (O/C) ratio and space time under conditions of: 5.9 ml/min. (3.33 kWth), S/C=2.0, O/C of 1.0; 5% reformer thermal losses. Reformer inlet temperature of 425° C. The chart 1220 addresses a relationship between molar oxygen to carbon (O/C) ratio and space time with oxygen-enrichment under conditions of: 5.9 ml/min. (3.33 kWth), S/C=2.0, 0/C of 1.0; 5% reformer thermal losses, and reformer inlet temperature of 425° C. These charts illustrate that a significant consequence of oxygen enrichment is that it decouples a molar oxygen to carbon ratio (O/C) and reformer space time. This allows the ability to maintain an optimum molar ratio of oxygen and carbon (e.g., from the fuel 360 of FIG. 3) while independently optimizing residence time.

FIGS. 13A-D illustrate one embodiment of four charts 1310-1340. These four charts illustrate how performance can be improved with increasing oxygen enrichment. Three lines are shown in the charts 1310-1340—diamond for 3.33 kW$_{th}$, square for 5.00 kW$_{th}$, and circle for 6.67 kW$_{th}$—and in charts 1330 and 1340 triangles are for 8.33 kW$_{th}$. This shows that as oxygen enrichment levels (EN) are increased, fuel conversion becomes more efficient and reactions can lose kinetic or mass transfer limitations, and the capacity (e.g, fuel throughput or process thermal rating) can be greatly increased. Therefore, charts 1310-1340 address an influence of oxygen-enrichment on fuel conversion under experimental conditions of: S/C=2, fuel consisting of 70 vol % dodecane, 20 vol % toluene, 10 vol % decalin; fuel flow of 5.9 ml/min. (3.33 kW$_{th}$), 8.85 ml/min (5.0 kW$_{th}$), and 11.8 ml/min. (6.67 kW$_{th}$), and 14.76 ml/min. (8.33 kW$_{th}$); enrichment number ($\Psi$) of 0.477, 1.0, 1.432, and 1.91; with 425° C. entrance temperature.

Figure 14:
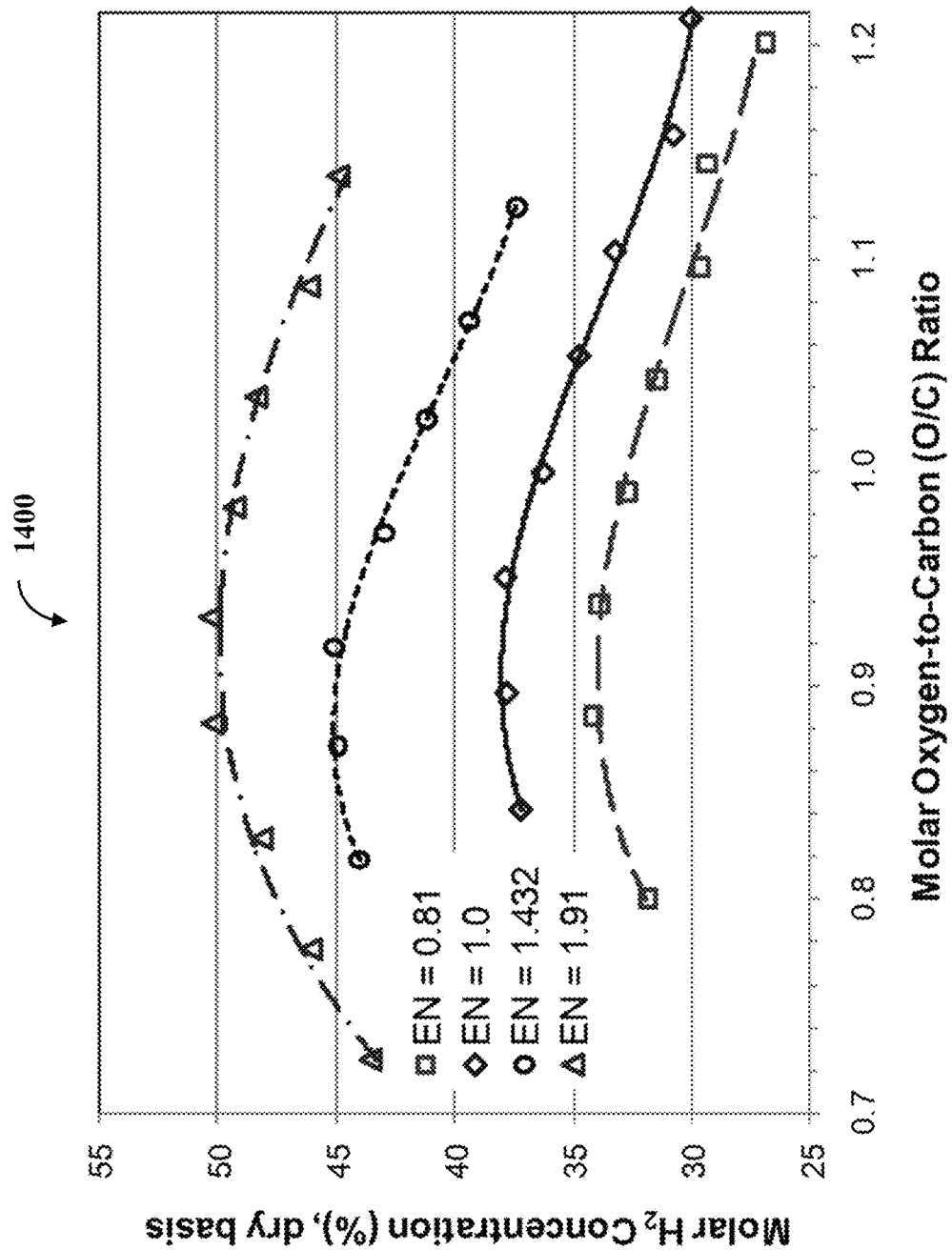

FIG. 14 illustrates one embodiment of a chart 1400. The chart 1400 shows how hydrogen concentration changes as a function of oxygen enrichment and in turn an effect of oxygen enrichment on hydrogen concentration in the reformate stream. This is shown under conditions of: S/C=2, fuel consisting of 70 vol % dodecane, 20 vol % toluene, 10 vol % decalin; fuel flow of 5.9 ml/min. (3.33 kW$_{th}$), enrichment number (Ψ) of 0.477, 1.0, 1.432, and 1.91; with 425° C. entrance temperature.

Figure 15:
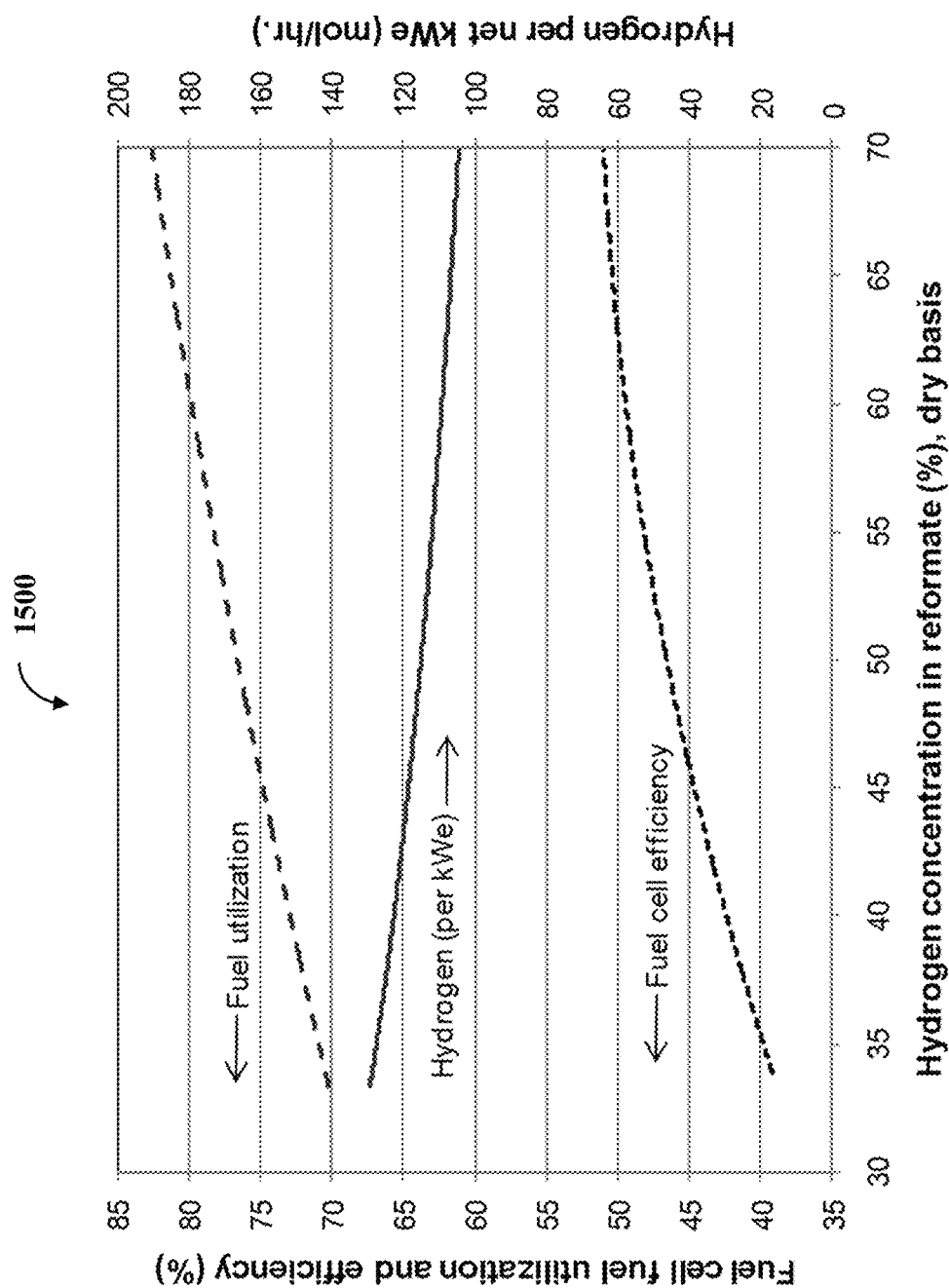

FIG. 15 illustrates one embodiment of a chart 1500. The chart 1500 shows that with increased hydrogen concentration, fuel cell efficiency increases and fuel utilization increases while the hydrogen flow rate per kWe output decreases for a fixed fuel cell power output. The chart 1500 therefore shows the effect of hydrogen concentration entering the fuel cell stack on the overall stack efficiency based on the lower heating value of hydrogen. Initial stack voltage assumed at 0.7 volts/cell, with an anode hydrogen entrance concentration of 33.9% (dry basis, mole %), cell temperature of 800° C., pressure of 1 atm, and steam and oxygen concentrations are assumed constant. Fuel utilization is based on maintaining 15% (mole %)hydrogen in the exit of the fuel cell anode. One equation that can be used in conjunction with the chart 1500 is shown below as equation 4. Equation 4 shows analytically the effect of hydrogen concentration of fuel cell efficiency ($\eta_{LHV}$).

$$\eta_{LHV} = u_{fuel} \cdot \left( \frac{E_1 - \frac{RT}{2\mathfrak{F}} \cdot \ln\frac{(X_{H_2})_2}{(X_{H_2})_1}}{1.25} \cdot 100\% \right) \qquad [4]$$

where, $u_{fuel}$ Nernst the anode fuel utilization, $E_1$ is the Nest cell voltage at condition 1, R is the ideal gas constant (8.314 J/mol-K), $\mathfrak{F}$ is Faraday's constant (96,485 Coulombs/mol), and Xi is the partial pressure of i, subscripts 1 and 2 refer to two conditions.

Figure 16A:
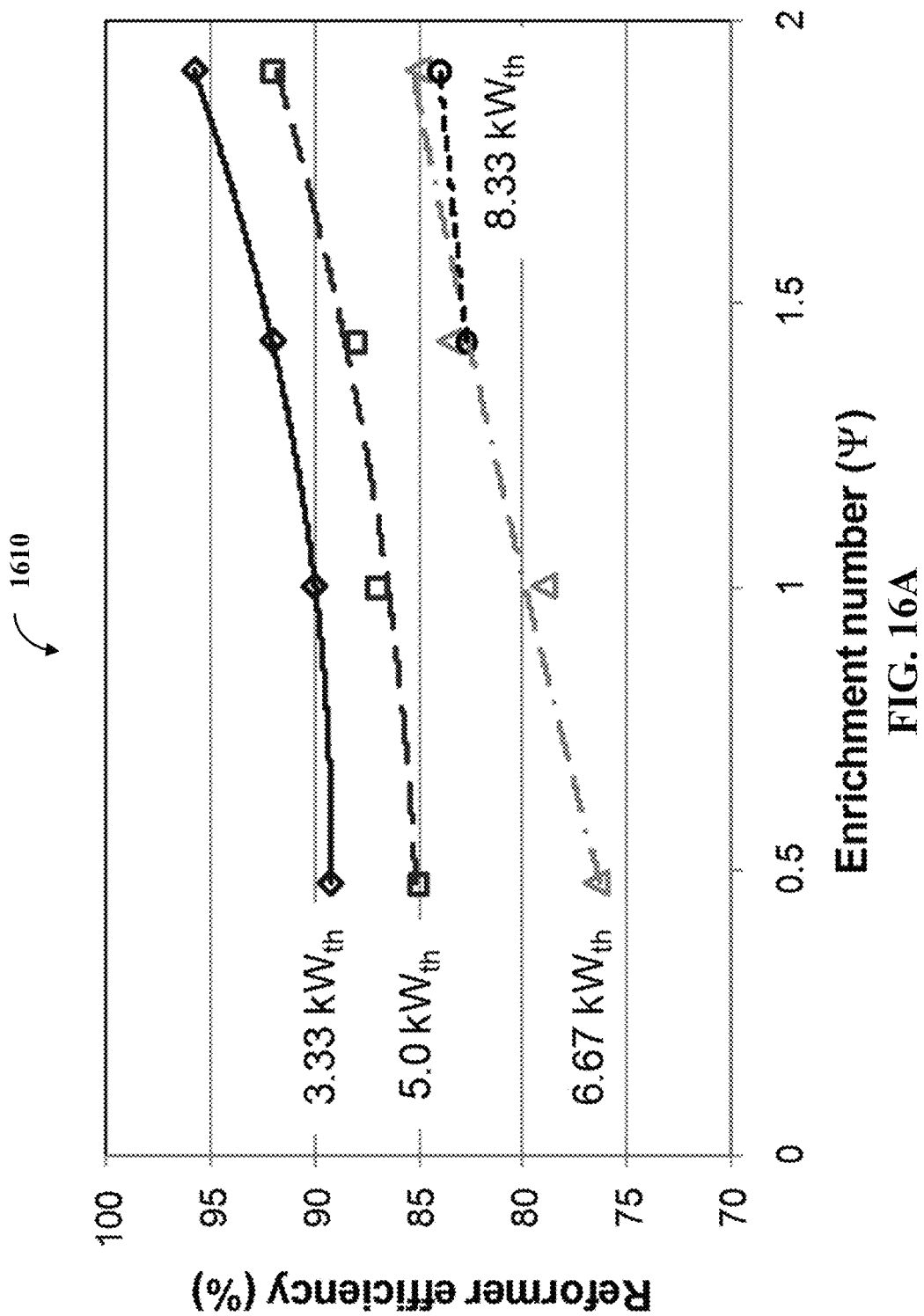
Figure 16B:
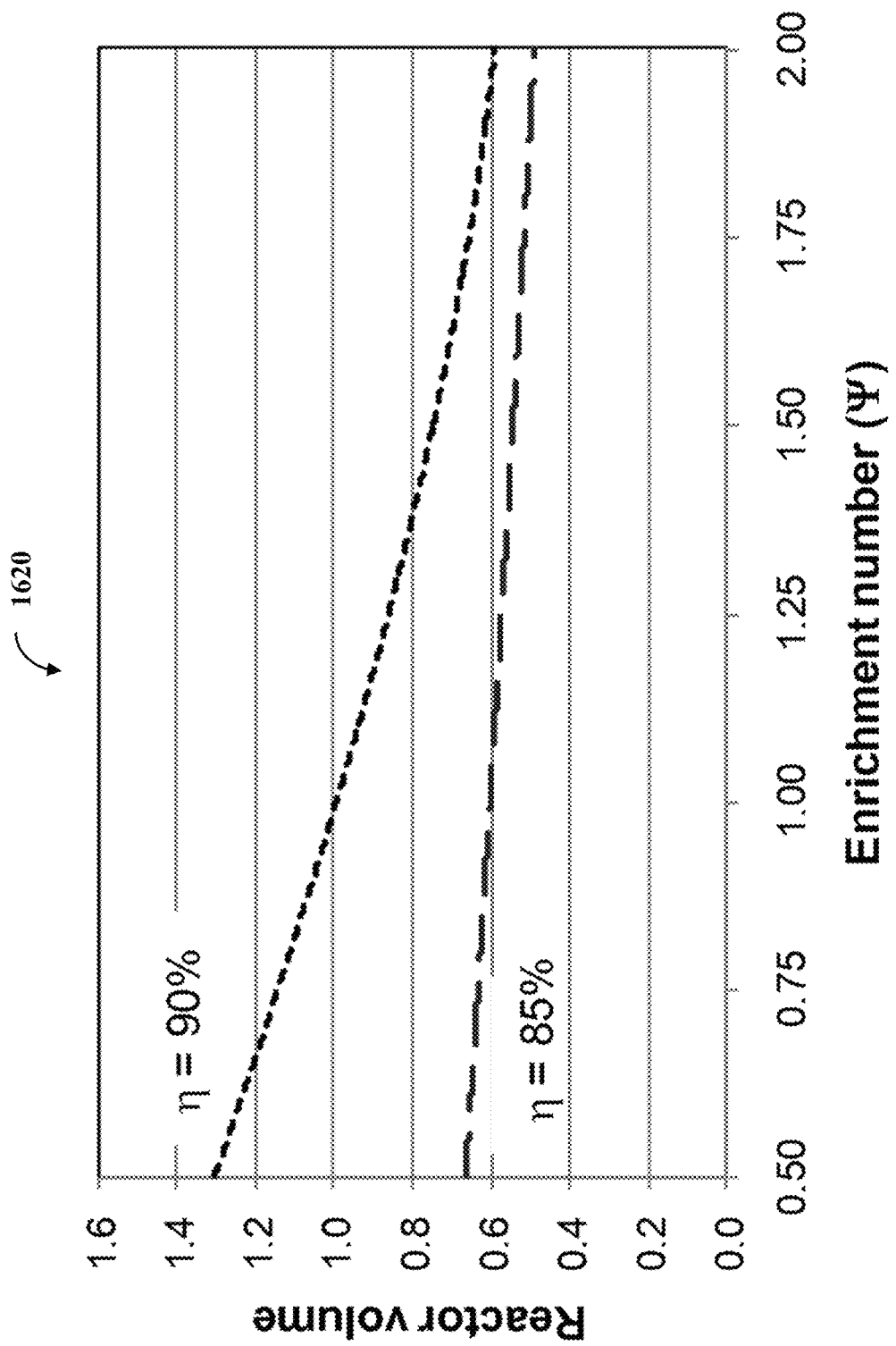

FIGS. 16A-B illustrate one embodiment of two charts 1610 and 1620. The charts 1610 and 1620 address oxygen enrichment's influence on optimizing system efficiency, capacity (e.g., fuel through-put or process thermal rating), size and weight under experimental conditions of: S/C=2, fuel consisting of 70 vol % dodecane, 20 vol % toluene, 10 vol % decalin; fuel flow of 5.9 ml/min. (3.33 kW$_{th}$), 8.85 ml/min (5.0 kW$_{th}$), and 11.8 ml/min. (6.67 kW$_{th}$), and 14.76 ml/min. (8.33 kW$_{th}$); enrichment number (Ψ) of 0.477, 1.0, 1.432, and 1.91; with 425° C. entrance temperature. The chart 1610 shows reformer efficiency against oxygen enrichment (shown as enrichment number). Where the enrichment number is defined by equation 5 below:

$$\text{Enrichment number}(\Psi) \equiv \qquad [5]$$
$$\frac{\text{Percentage oxygen in enriched air}}{\text{Percentage oxygen in air}} = \frac{X\%}{20.95\%}$$

The chart 1620 shows reformer volume (e.g., volume of the reformer 310 of FIG. 3) against oxygen enrichment. Use of oxygen enrichment can allow optimization of a reformer according to maximum efficiency, maximum capacity, and minimal size and weight. Reformer volume can be defined as the ratio of reformer volume with oxygen-enrichment to reformer volume with air.

Figure 17:
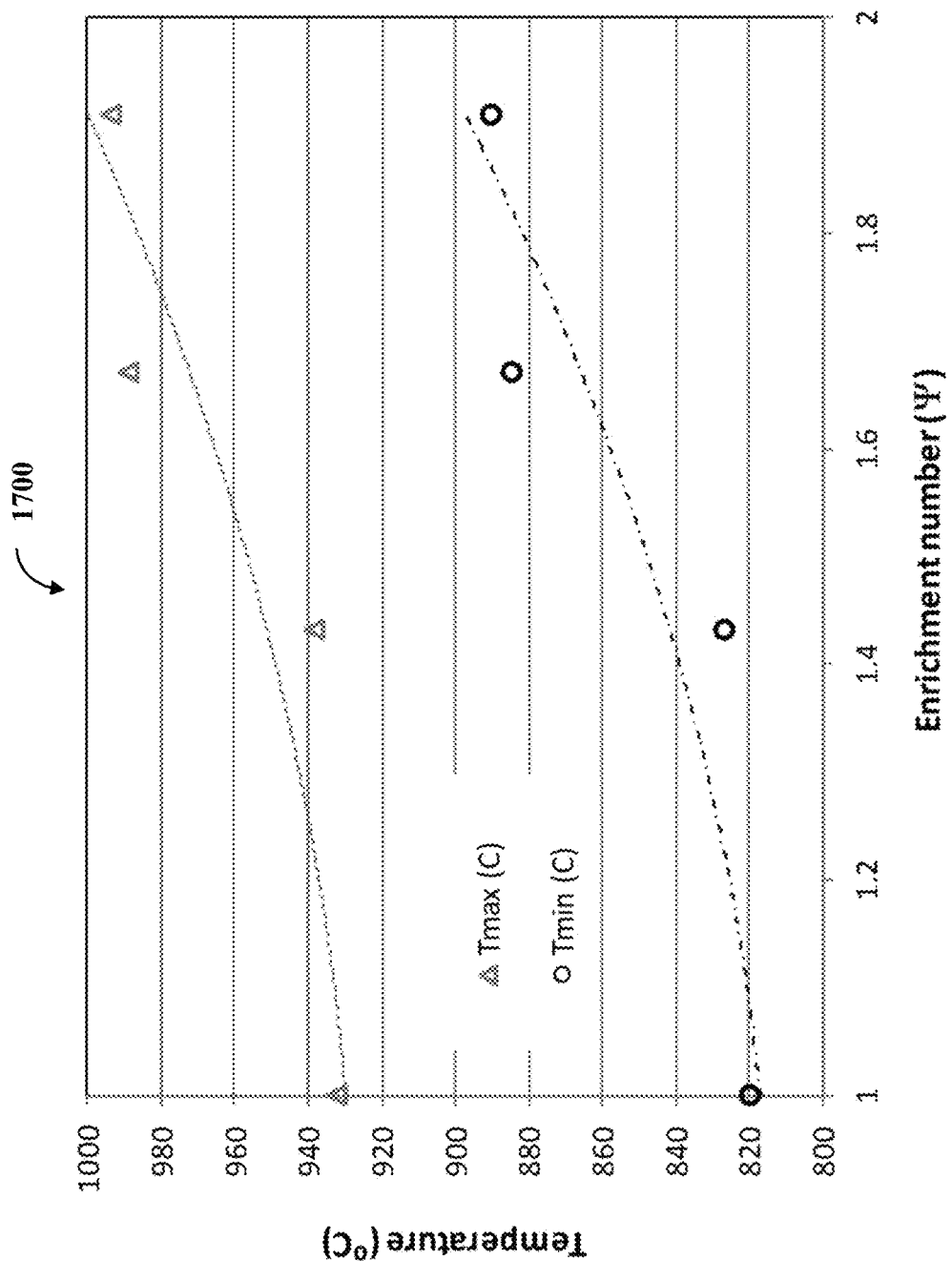

FIG. 17 illustrates one embodiment of a chart 1700. The chart 1700 addresses an effect of oxygen enrichment on reformer operating temperature under experimental conditions of: 100 vol % n-dodecane, 3.3 kWth (5.9 ml/min.), O/C=1.0, S/C=2.0; with 425° C. entrance temperature. As shown in the chart 1700, increasing oxygen enrichment results in higher reformer temperature, such as exit and peak reformer temperatures. Reactions are a strong function of temperature, which is shown through equation 6 below:

$$k = A\left(\frac{T}{T_0}\right)^\beta \exp\left[\frac{E_a}{RT}\right] \qquad [6]$$

where, k is the rate constant, A is the pre-exponential factor, T is the reaction temperature, To is a reference temperature, β is a number determined experimentally, $E_a$ is the activation energy, and R is the gas constant. In view of this, higher temperatures can result in increased reactions over a fixed unit of time.

Figure 18:
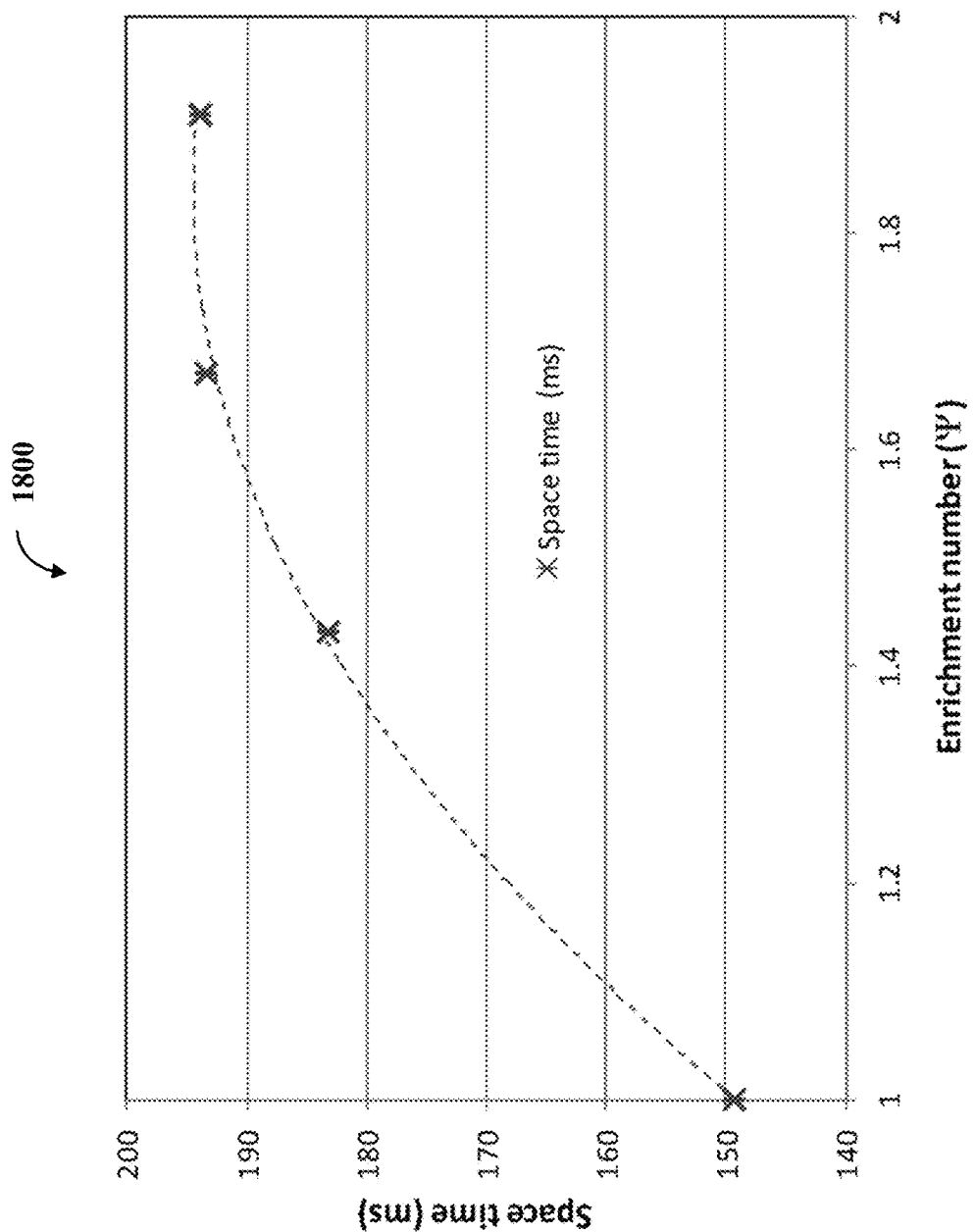

FIG. 18 illustrates one embodiment of a chart 1800. The chart 1800 addresses an effect of oxygen enrichment on residence time under experimental conditions of: 100 vol % n-dodecane, 3.3 kWth (5.9 ml/min.), O/C=1.0, S/C=2.0; with 425° C. entrance temperature. The chart 1800 compares space time against oxygen enrichment. Increased oxygen enrichment results in longer space time which allows slow reactions to go to completion (e.g., slow reactions that do not go to completion result can result in carbon formation within the reformer 310 of FIG. 3).

Figure 19:
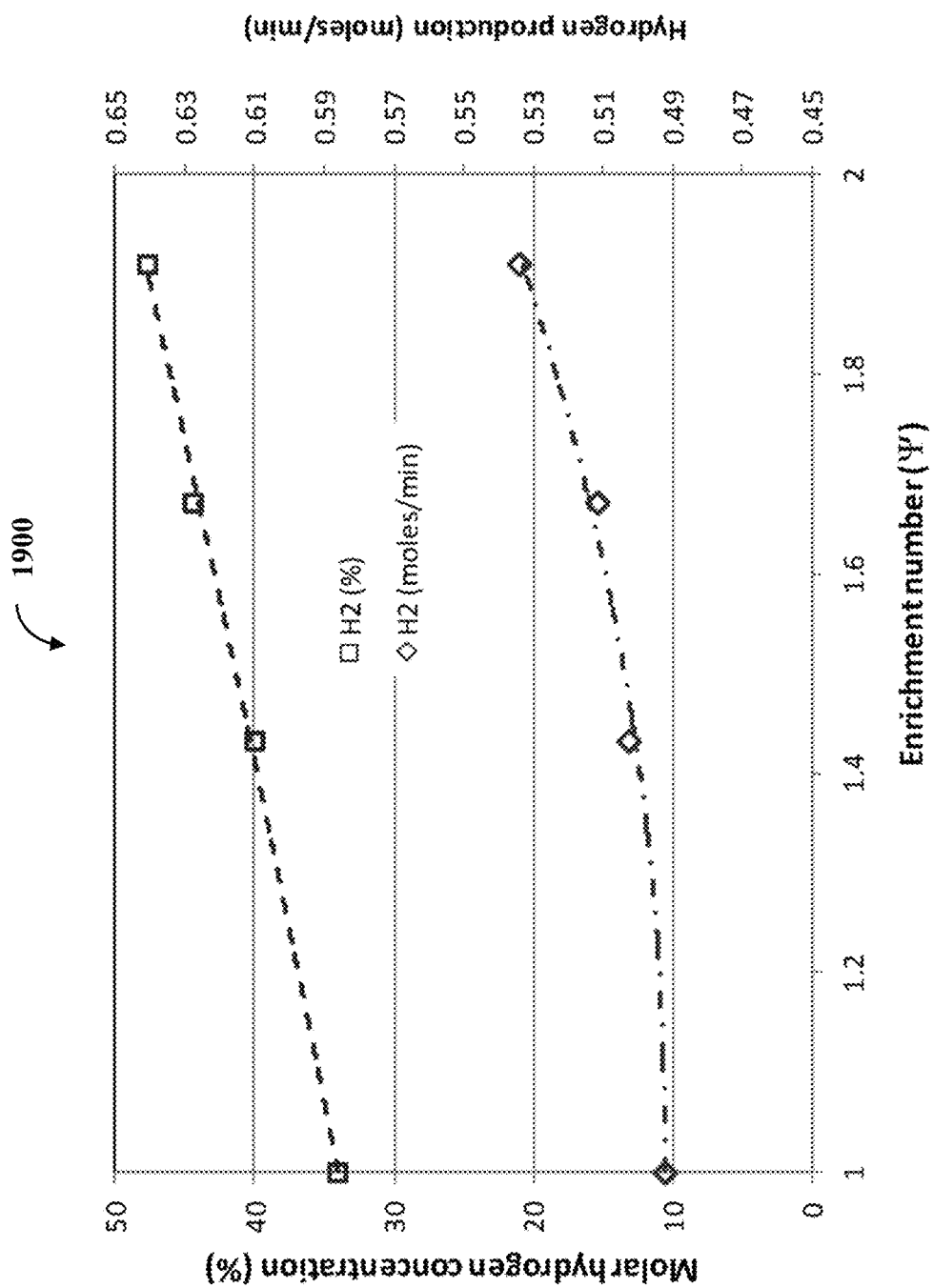

FIG. 19 illustrates one embodiment of a chart 1900. The chart 1900 shows that with oxygen enrichment, hydrogen concentration is increased as is the hydrogen production rates. With this, the chart 1900 shows an effect of oxygen enrichment on hydrogen concentration in the reformate stream under experimental conditions of: 100 vol % n-dodecane, 3.3 kWth (5.9 ml/min.), O/C=1.0, S/C=2.0; 425° C. entrance temperature. This hydrogen can function as a reducing agent within the reformer that mitigates the formation of solid carbon and sulfur that otherwise could combine with catalyst materials resulting in catalyst deactivation.

Figure 20:
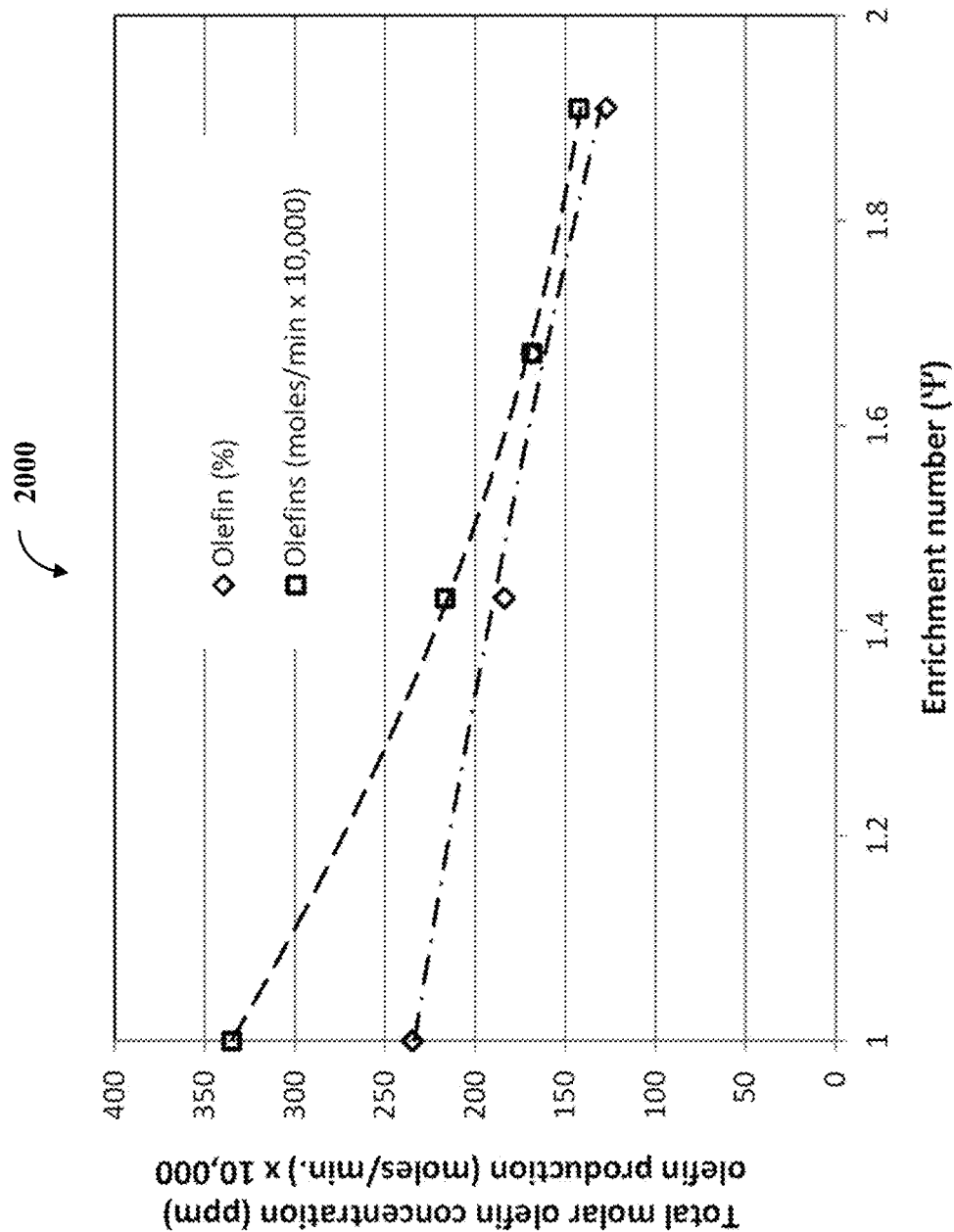

FIG. 20 illustrates one embodiment of a chart 2000. The chart 2000 shows olefin concentration production and olefin molar production as a function of oxygen enrichment. Chart 2000 addresses an effect of oxygen enrichment on carbon formation (olefin concentration is a predictor of carbon formation) in reformate under experimental conditions of: 100 vol % n-dodecane, 3.3 kWth (5.9 ml/min.), O/C=1.0, S/C=2.0; with 425° C. entrance temperature. Increased oxygen enrichment can lead to reduced olefin production and in turn reduced carbon production due to longer reaction time causing more olefins to be converted. In addition, increased hydrogen can remove carbon that is produced through the following reaction: $C+2H_2 \rightarrow CH_4$.

Figure 21A:
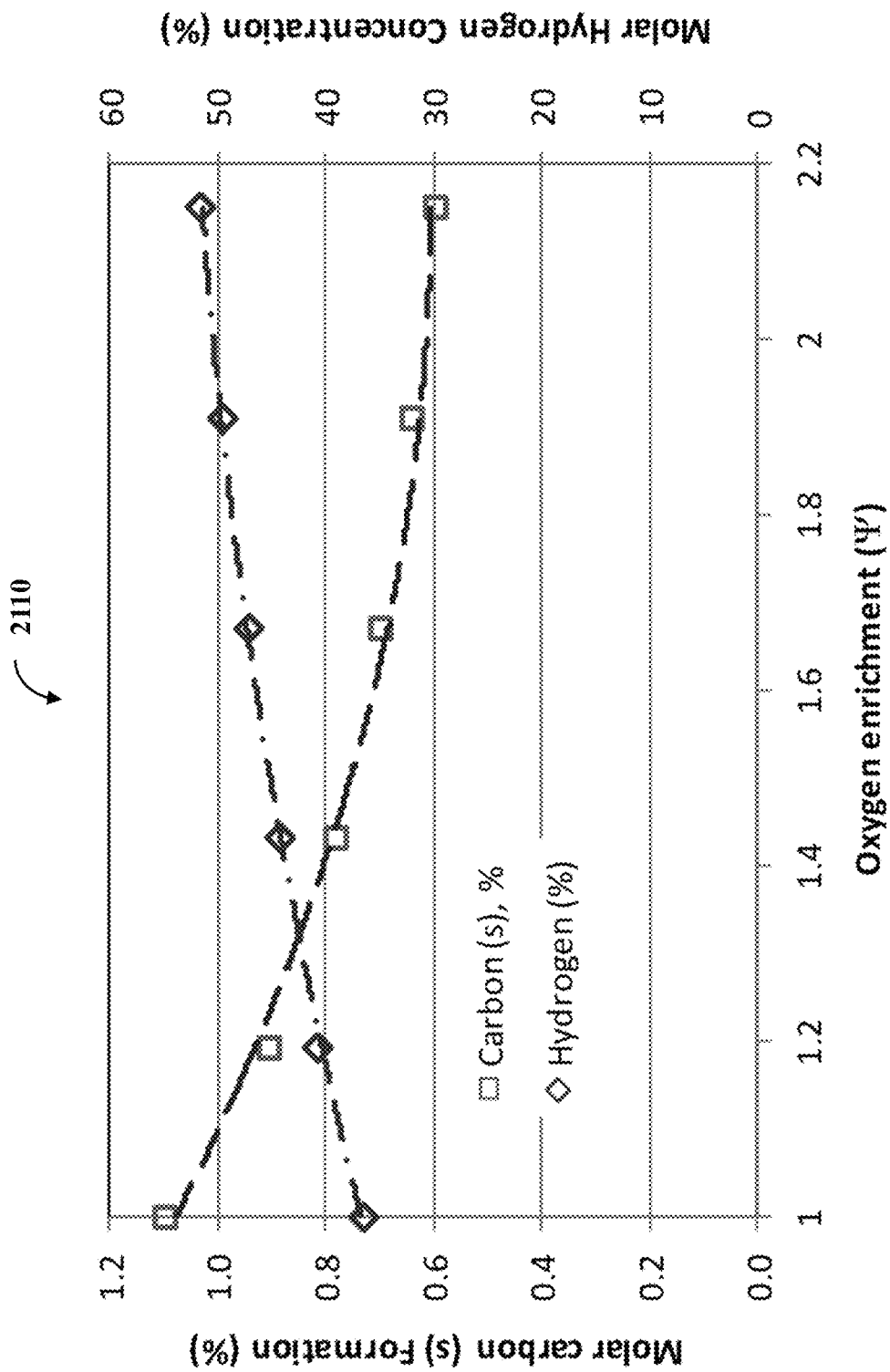
Figure 21B:
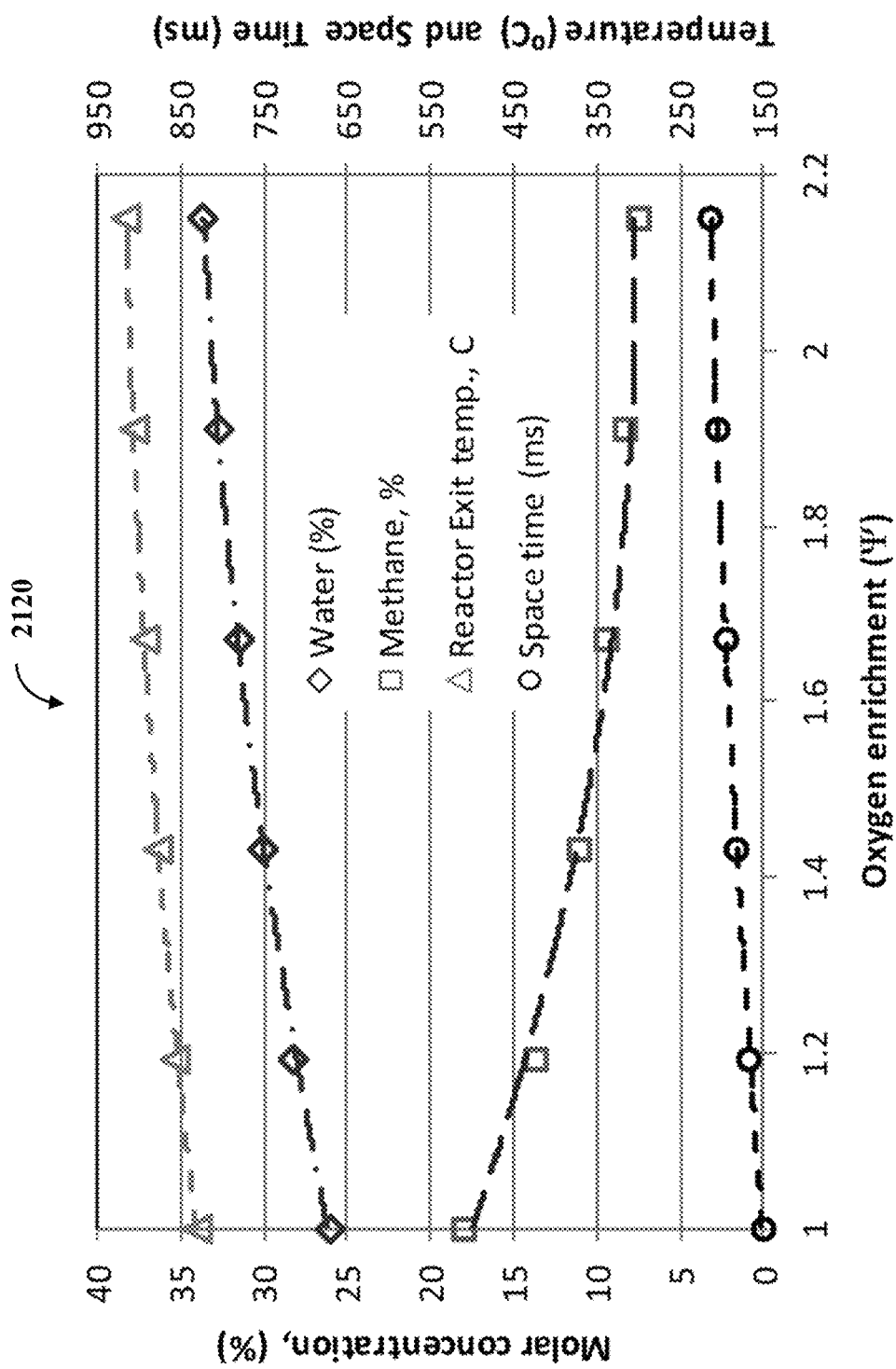

FIGS. 21A-B illustrate one embodiment of two charts 2110 and 2120. The charts 2110 and 2120 address an effect of oxygen enrichment on carbon formation in reformate. This is based on equilibrium modeling under conditions of: 100 vol % n-dodecane, 3.3 kWth (5.9 ml/min.), O/C=1.0, S/C=2.0; with 425° C. entrance temperature. The chart 2110 shows reduction is solid carbon formation and an increase in hydrogen as a function of increased oxygen enrichment. The chart 2120 shows increased reformer operating temperature and in turn faster reactions, increased reformer space time that allow reactions to go to completion or further into completion, as well as higher concentration of water enhancing steam reforming reactions such as $CH_4+H_2O \rightarrow 3H_2+CO$ which improves fuel conversion.

Figure 22A:
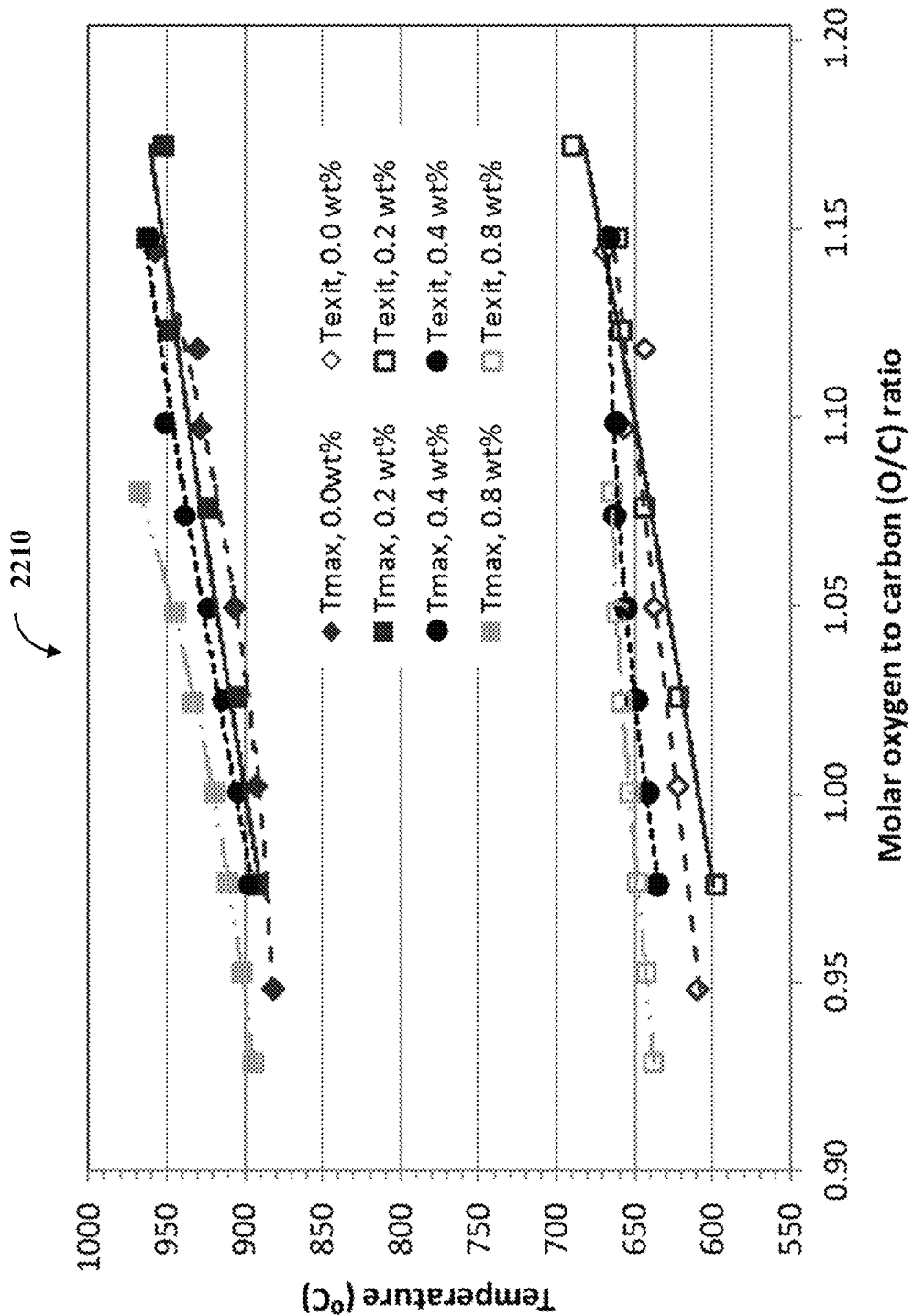
Figure 22B:
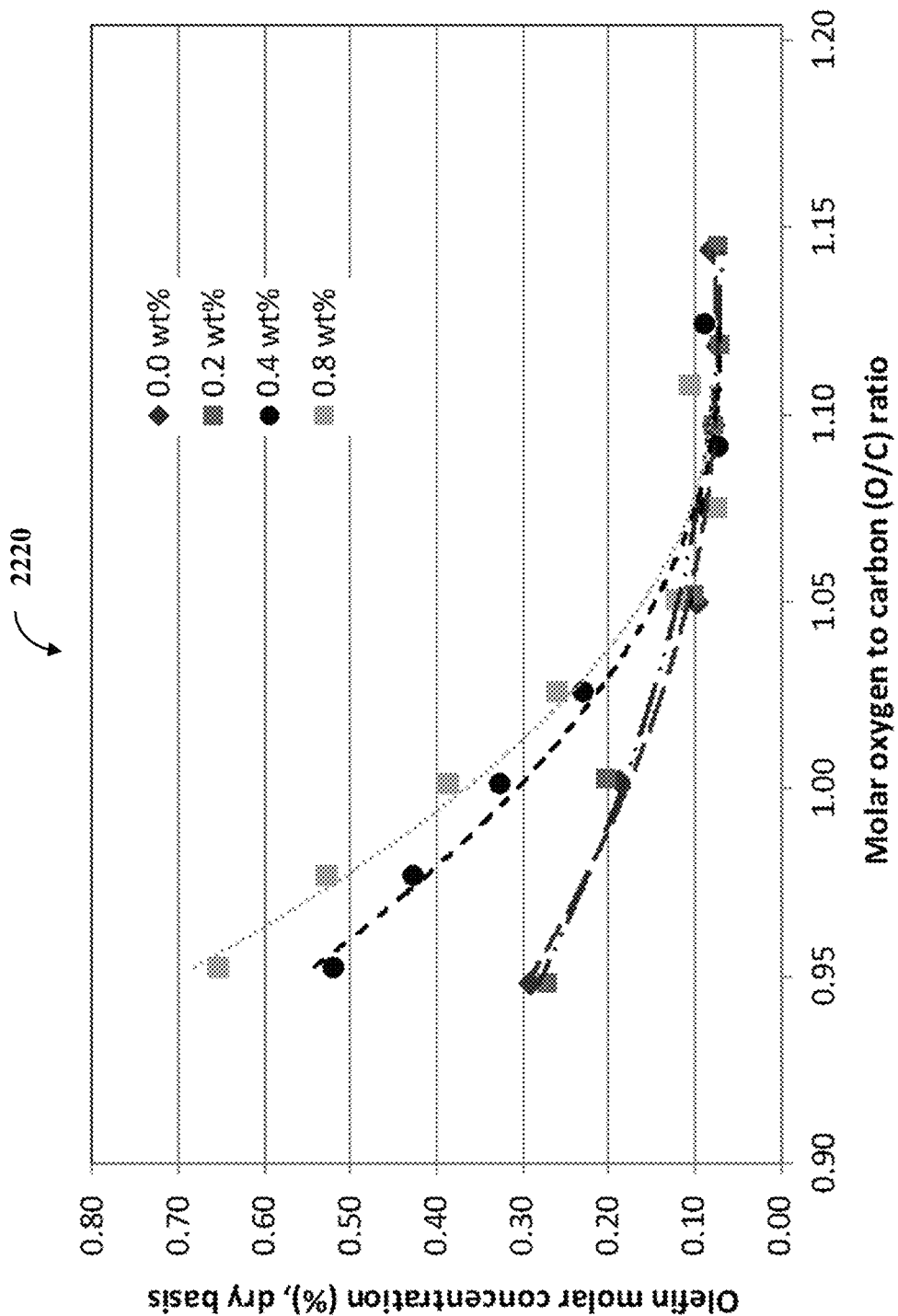

FIGS. 22A-B illustrate one embodiment of two charts 2210 and 2220. The charts 2210 and 2220 address effects of carbon formation on peak reformer operating temperatures under conditions of: straight paraffinic kerosene (SPK) with 1-methylnaphthalene added at indicated weight percentages (wt %), 2.14 kWth (3.0 ml/min.), molar O/C=1.05, molar S/C=1.3. The charts 2210 and 2220 show that as carbon formation rises (seen as a rise in olefin concentration), reformer peak temperature rises. Modifying the oxygen enrichment can mitigate temperature changes and reduce carbon formation. In view of this, a change in the reformer can indicate an onset of catalyst deactivation through carbon formation and/or sulfur poisoning. Oxygen enrichment can be used as a tool to mitigate these deactivation mechanisms.

What is claimed is:

1. A method configured to be performed by a controller of a fuel system, the method comprising:
   identifying a desired residence time for a reaction set of a reformer that is part of the fuel system; and
   causing the reformer to be supplied with a matter state at an oxygen-enrichment level to meet the desired residence time,
   setting an operational temperature of the reformer by way of a molar oxygen-to-carbon ratio;
   identifying a fuel type for the fuel system; and
   setting the desired residence time based, at least in part, on the fuel type and inlet flow rate,
   wherein the oxygen-enrichment level of the matter state is higher than an oxygen-enrichment level of air,
   wherein the reaction set includes catalytic reforming,
   wherein causing the reformer to be supplied with a matter state at an oxygen-enrichment level is achieved through directing the matter state to be supplied through a membrane separator,
   wherein the temperature of the reformer influences the desired residence time for the reaction set.

2. The method of claim 1, comprising:
   checking if the reaction set is functioning with the desired residence time by way of measuring inlet flow rate of the reformer;
   determining how to change the oxygen-enrichment level to meet the desired residence time when the check results that the reaction set is not functioning with the desired residence time; and
   causing supply of the matter state at the oxygen-enrichment level in view of the change to meet the desired residence time.

3. The method of claim 2,
   where the matter state is produced from supplying the air through a separator that produces the matter state at the oxygen-enrichment level that is higher than air and that produces a matter state with a nitrogen-enrichment level that is higher than air.

4. The method of claim 2, comprising
   checking if the reformer is operating at a set temperature point;
   determining how to change operation of the reformer when the temperature check results that the reformer is not operating at the set temperature point; and
   changing the operation of the reformer in accordance with the determination.

5. The method of claim 4,
   where changing the operation of the reformer in accordance with the determination comprises changing a molar oxygen-to-carbon ratio of the reformer.

6. The method of claim 5,
   where the molar oxygen-to-carbon ratio is changed by changing a flow rate of the supplied matter state.

7. The method of claim 1, comprising:
   causing the reformer to be supplied with a fuel at a fuel rate, where the reformer uses the fuel and the matter state to perform the reaction set.

8. The method of claim 7,
   where the matter state is produced from supplying the air through a separator that produces the matter state at the oxygen-enrichment level that is higher than air and that produces a matter state with a nitrogen-enrichment level that is higher than air.

9. The method of claim 7, comprising:
   determining a sensed load demand of the reformer; and
   determining a fuel flow rate based, at least in part, on the sensed load demand,
   where the reformer is supplied with the matter state at the determined fuel flow rate.

10. The method of claim 1, wherein the produces a matter state with a nitrogen-enrichment level that is higher than air.

11. The method of claim 1, comprising:
    monitoring a functional temperature of the reformer;
    comparing the functional temperature of the reformer against the operational temperature of the reformer to produce a comparison result;
    determining if the comparison result is sufficient to warrant a change in the supply of the matter state to the reformer;
    deciding a manner of change when the determination is that the comparison result is sufficient; and
    causing implementation of the change.

12. The method of claim 11,
    where the change is modification of a flow rate at which the matter state is supplied to the reformer.

13. The method of claim 11,
    where the change is modification of a pressure at which the matter state is supplied to the reformer.

* * * * *